(12) United States Patent
Grimm et al.

(10) Patent No.: US 11,576,301 B2
(45) Date of Patent: *Feb. 14, 2023

(54) SYSTEMS AND METHODS FOR HANDLING FLUID FOR APPLICATION TO AGRICULTURAL FIELDS

(71) Applicant: Capstan Ag Systems, Inc., Topeka, KS (US)

(72) Inventors: Jeffrey John Grimm, Holton, KS (US); Andrew Boyd, Lecompton, KS (US); Kale Schrader, Hiawatha, KS (US)

(73) Assignee: CAPSTAN AG SYSTEMS, INC., Topeka, KS (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/930,082

(22) Filed: May 12, 2020

(65) Prior Publication Data

US 2020/0267893 A1 Aug. 27, 2020

Related U.S. Application Data

(63) Continuation of application No. 16/058,323, filed on Aug. 8, 2018, now Pat. No. 10,667,463, which is a
(Continued)

(51) Int. Cl.
*A01C 23/00* (2006.01)
*A01C 23/02* (2006.01)
(Continued)

(52) U.S. Cl.
CPC .......... *A01C 23/007* (2013.01); *A01C 23/008* (2013.01); *A01C 23/022* (2013.01); *B05B 15/40* (2018.02); *B05B 13/005* (2013.01)

(58) Field of Classification Search
CPC ...... A01C 23/007; A01C 23/008; A01C 23/00; A01C 23/021; A01C 23/02; A01C 23/022;
(Continued)

(56) References Cited

U.S. PATENT DOCUMENTS 5,967,066 A 10/1999 Giles et al.
6,269,757 B1 8/2001 Kiest
(Continued)

FOREIGN PATENT DOCUMENTS

CA 2559358 A1 * 10/1998 ............. C01B 13/10
WO WO-0068049 A2 * 11/2000 ............. B60T 13/263

*Primary Examiner* — Christopher J. Novosad
(74) *Attorney, Agent, or Firm* — Armstrong Teasdale LLP

(57) ABSTRACT

A system for handling a fluid includes a container for separating the fluid into a liquid and a vapor such that at least a portion of the vapor is disposed above the liquid. The system also includes at least one valve for releasing the vapor from the container, at least one sensor to detect a level of the liquid in the container, and a controller in communicatively coupled to the at least one valve and the at least one sensor. The controller is configured to control the at least one valve to release the vapor such that the liquid level is maintained at or above a desired liquid level. The controller is configured to determine diagnostic data based at least in part on signals received from the least one valve and the at least one sensor.

13 Claims, 25 Drawing Sheets

Related U.S. Application Data continuation of application No. 15/594,153, filed on May 12, 2017, now Pat. No. 10,064,325, which is a continuation-in-part of application No. 15/348,178, filed on Nov. 10, 2016, now Pat. No. 10,172,279.

(60) Provisional application No. 62/255,091, filed on Nov. 13, 2015.

(51) Int. Cl.
    *B05B 15/40* (2018.01)
    *B05B 13/00* (2006.01)

(58) Field of Classification Search
    CPC ....... B05B 15/40; B05B 13/005; B05B 15/00; B05B 13/00
    See application file for complete search history.

(56) References Cited

U.S. PATENT DOCUMENTS

| | | | |
|---|---|---|---|
| 6,484,653 B2 | 11/2002 | Swanson | |
| 7,096,802 B1 | 8/2006 | Kiest | |
| 7,162,961 B2 | 1/2007 | Grimm et al. | |
| 8,667,916 B1 | 3/2014 | Kiest | |
| 8,701,574 B2 | 4/2014 | Ballard et al. | |
| 9,618,381 B1* | 4/2017 | Dudar | G01F 23/30 |
| 10,064,325 B2 | 9/2018 | Grimm et al. | |
| 10,172,279 B2 | 1/2019 | Grimm et al. | |
| 2007/0124065 A1* | 5/2007 | Ho | G01C 21/32 340/995.12 |
| 2007/0175832 A1* | 8/2007 | Roberts | B01D 24/4631 210/275 |
| 2009/0301468 A1 | 12/2009 | Gray et al. | |
| 2011/0217437 A1* | 9/2011 | Leung | A47J 31/42 426/433 |
| 2017/0138154 A1 | 5/2017 | Burdick et al. | |

* cited by examiner

SYSTEMS AND METHODS FOR HANDLING FLUID FOR APPLICATION TO AGRICULTURAL FIELDS

CROSS-REFERENCE TO RELATED APPLICATIONS

This application is a continuation of U.S. patent application Ser. No. 16/058,323, filed on Aug. 8, 2018, which is a continuation of U.S. patent application Ser. No. 15/594,153, filed on May 12, 2017, which is a continuation-in-part of U.S. patent application Ser. No. 15/348,178, filed on Nov. 10, 2016, which claims priority to U.S. Provisional Patent Application Ser. No. 62/255,091, filed on Nov. 13, 2015, the disclosures of which are hereby incorporated by reference in their entirety.

BACKGROUND

The field of this disclosure relates generally to systems for handling fluid. More particularly, this disclosure relates to systems for handling fluid for application to agricultural fields.

The agricultural industry commonly applies fluids, such as fertilizer, to fields during the cultivation of crops. Nitrogen rich chemicals are typically used as fertilizer, which is applied to soil to provide nutrients for plants. Anhydrous ammonia, for example, is a relatively dense nitrogen source commonly used as a fertilizer. However, anhydrous ammonia must be maintained within a pressure range to remain in liquid form. Additionally, anhydrous ammonia can pose a health risk to people who inhale the anhydrous ammonia. Therefore, anhydrous ammonia must be contained in proper pressure vessels that are strictly regulated. For example, regulations require the pressure vessels to be regularly pressure tested. Pressure testing is performed by filling the pressure vessels with water, which can cause the vessels to rust and otherwise deteriorate over time. The deterioration causes the formation of particulates and other loose materials within the pressure vessels. Sometimes, additives are added to the fluid to enhance desirable characteristics of the fluid. However, these additives can bond to particulates in the pressure vessels and, thereby, increase the size of the particulates. The particulates and other loose materials can become mixed in the fluid stored in the pressure vessels. As a result, when fluid application systems withdraw fluid from the pressure vessels for application to fields, the particulates in the fluid can cause the systems to operate inefficiently and improperly.

Typical pressure vessels include an outlet for withdrawing fluid from the pressure vessel. The fluid often includes liquid and vapor. Sometimes, vapor can flow through the outlet as liquid is withdrawn from the pressure vessel and result in misapplication of the fluid on the field. For example, when the pressure vessel is transported across uneven ground, the liquid can flow away from the outlet causing vapor to flow through the outlet and resulting in misapplication. Some pressure vessels include sensors to detect the fluid flow. However, these sensors typically do not detect this misapplication because the sensors detect the vapor flowing through the outlet. In addition, vapor in the pressure vessels can otherwise be ingested into the application system causing operating inefficiencies and damage to equipment. Moreover, modern fluid application systems have increased rates of application that exacerbate these problems.

Some fluid application systems include strainers for removing some materials from fluid. However, the strainers are not designed for handling volatile fluids used as fertilizer, such as anhydrous ammonia. Therefore, the strainers cause operating inefficiencies, misapplications, and increased maintenance time for the fluid application systems. For example, the strainers are often plugged by the particulates and additives contained in the fluids. Additionally, the strainers are difficult to clean and can pose safety risks to the operator when the operators have to clean the strainers.

BRIEF DESCRIPTION

In one aspect, a system for handling a volatile fluid includes a container for separating the fluid into a liquid and a vapor such that at least a portion of the vapor is disposed above the liquid. The system also includes at least one valve for releasing the vapor from the container, at least one sensor to detect a level of the liquid in the container, and a controller in communicatively coupled to the at least one valve and the at least one sensor. The controller is configured to control the at least one valve to release the vapor such that the liquid level is maintained at or above a desired liquid level. The controller is configured to determine diagnostic data based at least in part on signals received from the least one valve and the at least one sensor.

In another aspect, a method for handling a fluid includes separating the fluid into a liquid and a vapor within a container such that at least a portion of the vapor is disposed above the liquid, detecting a level of the liquid in the container, and actuating at least one valve to exhaust the vapor from the container to maintain the level of the liquid at or above a desired level. The at least one valve is communicatively coupled to a controller. The method further includes sending a signal from the at least one valve to the controller, and determining diagnostic data based at least in part on the signal.

In yet another aspect, a method of assembling a fluid handling system includes connecting at least one valve to a container. The container is configured to separate a fluid into a liquid and a vapor such that at least a portion of the vapor is disposed above the liquid. The at least one valve is configured to release the vapor from the container. The method also includes positioning at least one sensor within or adjacent to the container to detect a level of the liquid level in the container. The method further includes communicatively connecting a controller to the at least one valve and the at least one sensor. The controller is configured to control the at least one valve to release the vapor such that the liquid level is maintained at or above a desired liquid level. The controller is configured to determine diagnostic data based at least in part on signals received from at least one of the at least one valve and the at least one sensor.

DETAILED DESCRIPTION OF THE DRAWINGS

Figure 1:
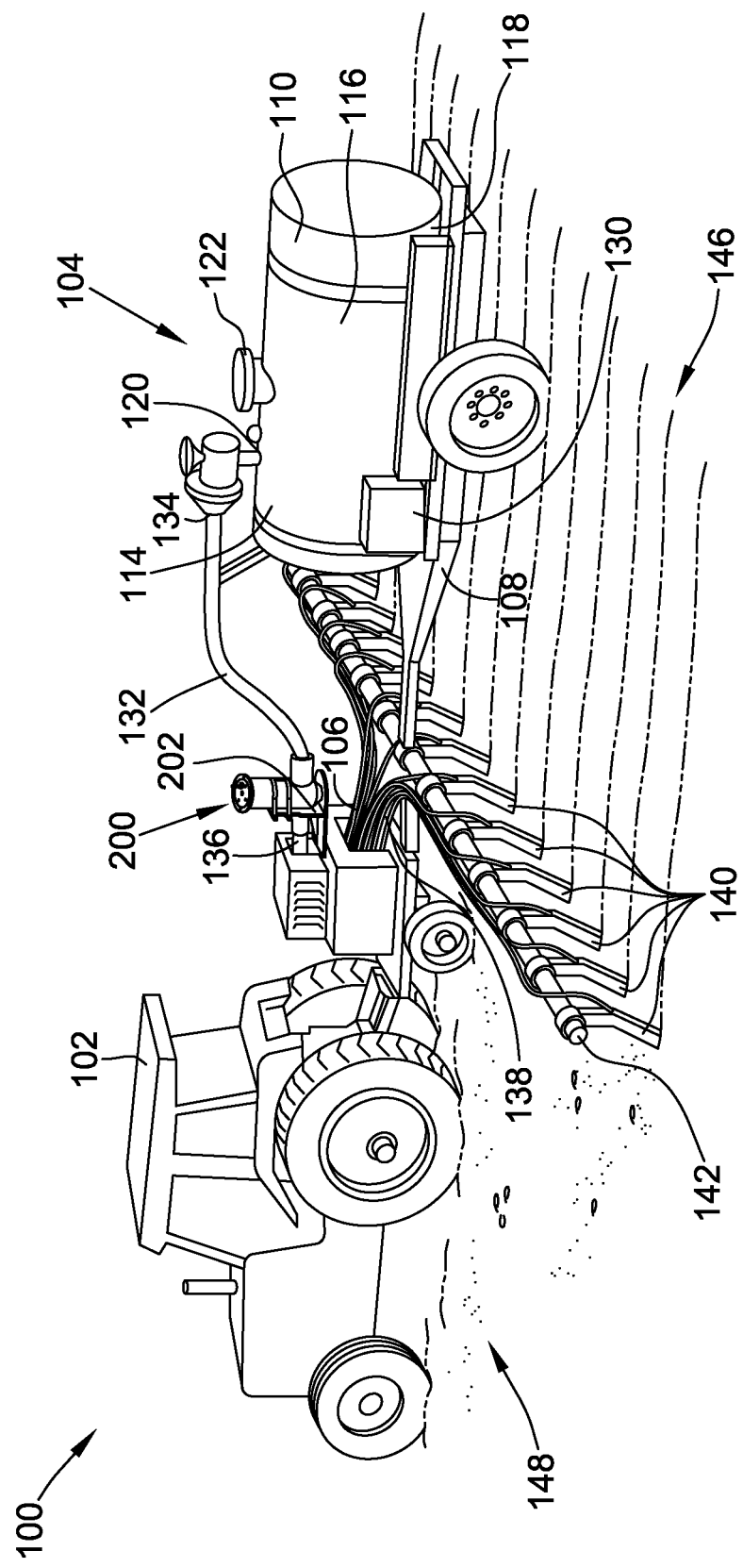
FIG. 1 is a perspective view of an embodiment of a fluid application system.
Figure 2:
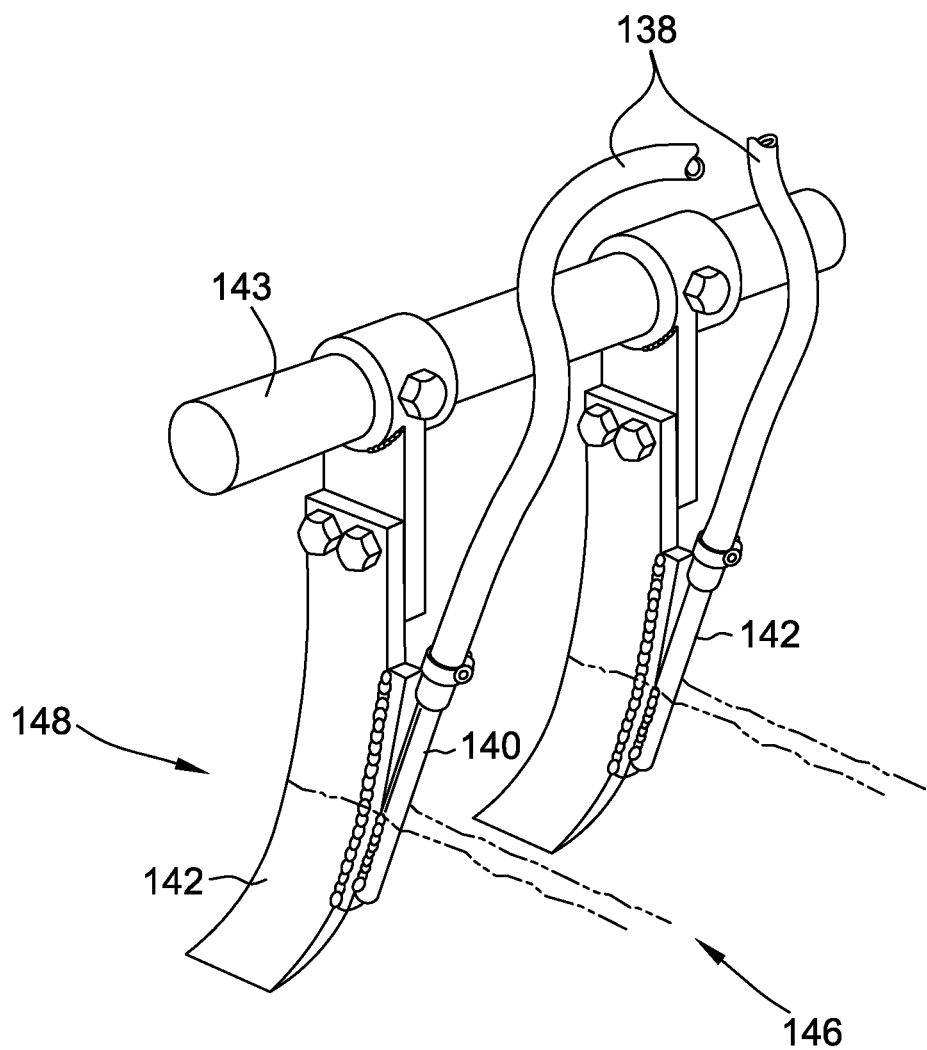
FIG. 2 is a perspective view of a portion of the fluid application system shown in FIG. 1.
Figure 3:
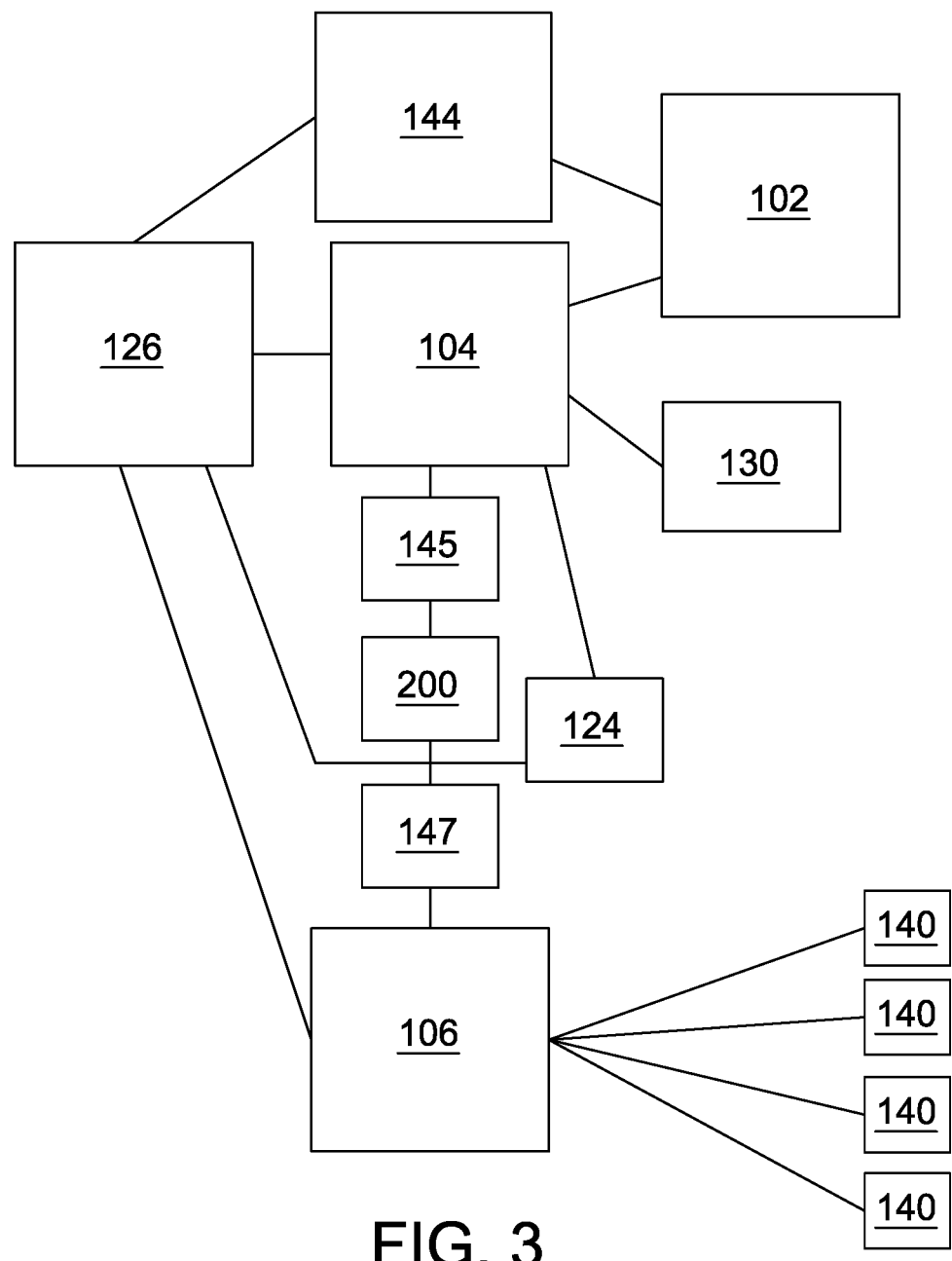
FIG. 3 is a schematic view of the fluid application system shown in FIG. 1.

Referring now to the drawings and in particular to FIGS. 1-3, one embodiment of a volatile liquid fertilizer application system (broadly, a fluid application system) is designated in its entirety by the reference number 100. The fluid application system 100 includes a motorized vehicle 102, a fluid storage tank 104, and a distribution manifold 106. The motorized vehicle 102 may be any machine that enables the fluid application system 100 to function as described herein. In the exemplary embodiment, the motorized vehicle 102 is a tractor. In suitable embodiments, one or more components of the fluid application system 100 may be incorporated into the motorized vehicle 102 without departing from some aspects of this disclosure. In the exemplary embodiment, the fluid storage tank 104 and the distribution manifold 106 are disposed on a wheeled chassis 108 that is towed behind the motorized vehicle 102.

In the exemplary embodiment, the fluid storage tank 104 includes a sidewall 110 defining an interior space. In suitable embodiments, the fluid storage tank 104 may have any shape that enables the fluid application system 100 to function as described herein. In the illustrated embodiment, the sidewall 110 forms a cylinder having closed ends. With reference to the orientation shown in FIG. 1, the fluid storage tank 104 has an upper portion 114, a middle portion 116, and a lower portion 118. The middle portion 116 is disposed between the upper portion 114 and the lower portion 118. An outlet 120 and an inlet 122 are disposed in the upper portion 114. In suitable embodiments, the fluid storage tank 104 may include any number of outlets and inlets in any portions of the fluid storage tank 104 without departing from some aspects of this disclosure.

In suitable embodiments, fluid within the interior space includes vapor and liquid. Suitably, the fluid is separated such that at least a portion of the vapor is disposed above the liquid. A sensor 124 senses characteristics of the fluid storage tank 104, such as the level of the liquid in the fluid storage tank and sends the information to a controller 126. As will be described in more detail below, the controller 126 can determine diagnostic data, such as defining a liquid plane 230 (FIG. 5) and relating the level of the liquid to the liquid plane. Based at least in part on the diagnostic data, the controller 126 can control components of the fluid application system 100. In one embodiment, the fluid application system 100 includes at least one vapor valve for controlling the level of the liquid.

During operation, the fluid storage tank 104 may contain any type of fluid for distribution by the fluid application system 100. For example, the fluid storage tank 104 may store a volatile fluid intended to be applied to fields for agricultural purposes. A common fluid used for agricultural purposes is anhydrous ammonia, which is applied to fields primarily as a fertilizer to increase the nutrient level of soils. The anhydrous ammonia includes at least some gaseous substance and, therefore, is maintained at a carefully controlled pressure to control the gaseous properties. In the exemplary embodiment, the fluid storage tank 104 is configured to store and maintain the fluid at a desired pressure as fluid flows out of the fluid storage tank. The fluid application system 100 includes at least one pump 130 connected to the fluid storage tank 104 to facilitate maintaining the fluid in the fluid storage tank at the desired pressure.

In the exemplary embodiment, the fluid storage tank 104 is fluidly connected to a filtering system 200 and the distribution manifold 106 by a fluid line 132. Disposed between the filtering system 200 and the fluid storage tank 104 is a quick connect 134. A valve or metering component 136 is disposed downstream from filtering system 200. In suitable embodiments, the quick connect 134, valve 136, and filtering system 200 may be coupled to any portions of the fluid application system 100. For example, in some suitable embodiments, the filtering system 200 is disposed adjacent the fluid storage tank 104. Additionally, in some suitable embodiments, any of the quick connect 134, valve 136, and filtering system 200 may be omitted without departing from some aspects of this disclosure. In the exemplary embodiment, the quick connect 134 facilitates the fluid storage tank 104 being connected to and removed from the fluid line 132. The valve 136 controls fluid flow through the fluid line 132. For example, the valve 136 can be positionable between a closed position where fluid is inhibited from flowing through the fluid line 132 and an opened position where fluid is allowed to flow through the fluid line. In suitable embodiments, the valve 136 may be any valve that enables the fluid application system 100 to function as described herein. In the exemplary embodiment, the valve 136 is a ball valve. In suitable embodiments, any additional components may disposed along the fluid line 132 that enable the fluid application system 100 to function as described herein. For example, in some embodiments, any of the following are fluidly connected to fluid storage tank 104 and filtering system 200: a shutoff valve, a line breakaway, an excess flow valve, and a reverse flow valve. In the exemplary embodiment, the fluid application system 100 can detect malfunctions in any of the components along the fluid line 132 that may cause misapplication or improper operation.

The filtering system 200 is configured to filter and remove at least some material from the fluid, as will be described in more detail below. The filtering system 200 may remove materials of any type from the fluid. For example, in some embodiments, the filtering system 200 is configured to remove ferrous material from the fluid. In the exemplary embodiment, the filtering system 200 is connected to the fluid storage tank 104 adjacent the outlet 120 such that the filtering system removes material from fluid flowing out of the fluid storage tank 104 prior to the fluid flowing through the rest of the fluid application system 100. The filtering system 200 is mounted to the fluid application system 100 by a mounting bracket 202. In suitable embodiments, the filtering system 200 may be coupled to any portion of the fluid application system 100 without departing from some aspects of this disclosure.

After filtering, the fluid is directed out of the filtering system 200 and through the fluid line 132 into the distribution manifold 106. As shown in FIGS. 1 and 2, the distribution manifold 106 includes a plurality of supply lines 138 each connected to a dispensing tube 140 for injecting the fluid into a soil. The distribution manifold 106 distributes the fluid to the dispensing tubes 140 for emitting the fluid from the fluid application system 100. In suitable embodiments, the fluid application system 100 may include any number of dispensing tubes 140. In some embodiments, as the fluid is emitted from the dispensing tubes 140, the vehicle 102 moves the fluid application system 100 along a desired path for fluid application, such as rows 146 of a field 148. In the exemplary embodiment, the dispensing tubes 140 are connected to or positioned behind a soil preparation mechanism 142, such as a knife or plow, that contacts the soil as the dispensing tubes 140 dispense fluid onto the soil, as best seen in FIG. 2. The soil preparation mechanisms 142 are connected to a boom 143, which is connected to and pulled behind the vehicle 102.

In some embodiments, vapor release tubes, described in more detail herein, may be connected to the soil preparation mechanism 142 and/or the dispensing tubes 140. The vapor release tubes may discharge vapor from the filtering system 200 to the ground. For example, the vapor release tubes can be configured to release potentially harmful vapors, such as vapors from anhydrous ammonia, directly into the ground. Accordingly, the vapor release tubes prevent vapors from being released into the atmosphere. In addition, any residual treatment material within the vapor is applied directly to the soil.

In the embodiment shown in FIG. 3, the fluid application system 100 includes the controller 126 and an operator interface 144 connected to the controller. In suitable embodiments, the controller 126 may be any controller that enables the fluid application system 100 to function as described herein. The controller 126 may be connected to a plurality of sensors such that the controller 126 receives signals from the sensors. The sensors may send signals that include information relating to any characteristics of the fluid application system 100. For example, the sensors may send information including, without limitation, pressures, temperatures, duty cycles, densities, valve positions, geographic position system (GPS) data, and any other suitable characteristics of the fluid application system 100.

For example, in the illustrated embodiment, the controller 126 is communicatively coupled to a first sensor 145 positioned upstream of the filtering system 200 and a second sensor 147 positioned downstream of the filtering system 200. Each sensor 145, 147 may be configured to detect a characteristic of the fluid application system 100, including, for example and without limitation, a temperature of the fluid and a pressure of the fluid.

In suitable embodiments, the controller 126 may perform any functions based on the signals received from the sensors. For example, the controller 126 may perform at least one of the following functions: triggering an indicating alarm, stopping flow through the outlet 120, and causing liquid to bypass the outlet 120. In some embodiments, the controller 126 receives the information and can determine diagnostic data based on the information. The controller 126 may use additional information such as saturation curves and enthalpy charts, to determine the diagnostic data. In suitable embodiments, the diagnostic data may relate to any operational status of the fluid application system 100. The operational status may be any characteristics of the fluid application system 100 and/or fluid in the fluid application system. For example, the controller 126 may determine the amount of vapor released through a vapor valve 214 (FIG. 4) of the fluid application system 100.

In some embodiments, the controller 126 is configured to determine an operational status of the fluid application system 100 based on a temperature difference in the fluid between an upstream side of the filtering system 200 and a downstream side of the filtering system 200. In some embodiments, for example, the sensors 145, 147 output signals to the controller 126 indicative of a temperature of the fluid at the upstream and downstream sides, respectively, of the filtering system 200. The controller 126 is configured to determine the upstream and downstream fluid temperatures based on the signals, compare the determined fluid temperatures, and determine or calculate a temperature differential between the fluid temperature upstream of the filtering system 200 and the fluid temperature downstream of the filtering system 200. The controller 126 may diagnose and/or troubleshoot operating issues of the fluid application system 100 based on the calculated temperature differential. For example, a decrease in temperature between the first sensor 145 upstream of the filtering system and the second sensor 147 downstream of the filtering system 200 may indicate that at least a portion of the fluid is changing phase from a liquid to a gas, i.e., boiling off. Such boil off may indicate an operating issue of the fluid application system 100 and, in particular, the filtering system 200. For example, the occurrence of boil off may indicate that the filtering system 200 is at least partially obstructed and fluid is being inhibited from flowing through the filtering system 200. Accordingly, when the controller 126 determines that the calculated temperature differential is below a predetermined negative temperature differential threshold, the controller 126 may cause the operator interface 144 to output an audibly and/or visually-perceptible alarm or otherwise provide an indication to the user that there is a potential operating issue and/or that service, such as cleaning and/or replacing the filtering system 200, is required.

In some embodiments, the controller 126 may also generate spatial maps of the diagnostic data based on determined positions of the system. In some embodiments, for example, the controller 126 may receive determined positions from a GPS device communicatively connected to the controller 126, and generate a spatial map based on the GPS positions. The spatial map, for example, can relate the diagnostic data, such as vapor release rates and error readings, to corresponding positions of the fluid application system 100 at which the diagnostic data was recorded.

The diagnostic data can be used to determine and troubleshoot potential issues with the fluid application system 100. For example, relatively high or low rates of vapor release may indicate a blockage in the system. The diagnostic data can be used to recognize and correct the issues in real time and, thereby, prevent or minimize misapplication and/or damage to the fluid application system 100.

In the exemplary embodiment, the controller 126 sends the diagnostic data to the operator interface 144 for interpretation by an operator. The operator interface 144 may be any suitable interface that allows the operator to receive the diagnostic data. For example, the operator interface 144 may include a monitor mounted in the vehicle 102 to display the diagnostic data for the operator. In further embodiments, the operator interface 144 may be a mobile computing device wirelessly connected to the controller 126. In suitable embodiments, the operator interface 144 may allow the operator to input values and/or to control components of the fluid application system 100. The operator interface 144 may be coupled to the controller 126 such that commands from the operator interface are relayed to the controller 126 and/or other components of the fluid application system 100.

In suitable embodiments, the controller 126 is connected to and configured to send signals to and receive signals from any components of the fluid application system 100. For example, the controller 126 may be connected to and configured to send signals to and receive signals from the filtering system 200, fluid storage tank 104, and/or distribution manifold 106. The signals may relate to controlling operation of any of the components connected to the controller 126. In some embodiments, the controller 126 controls operation of components based at least in part on inputs of the operator. In further embodiments, the controller 126 may automatically control some operations of the fluid application system 100 based at least in part on the determined diagnostic data.

The controller 126 may include a wireless transceiver that enables controller 126 to connect to devices on a wireless network, e.g., Wi-Fi. Optionally, the controller 126 may include a port to allow for wired connection to devices in addition to or in place of the wireless transceiver.

Figure 4:
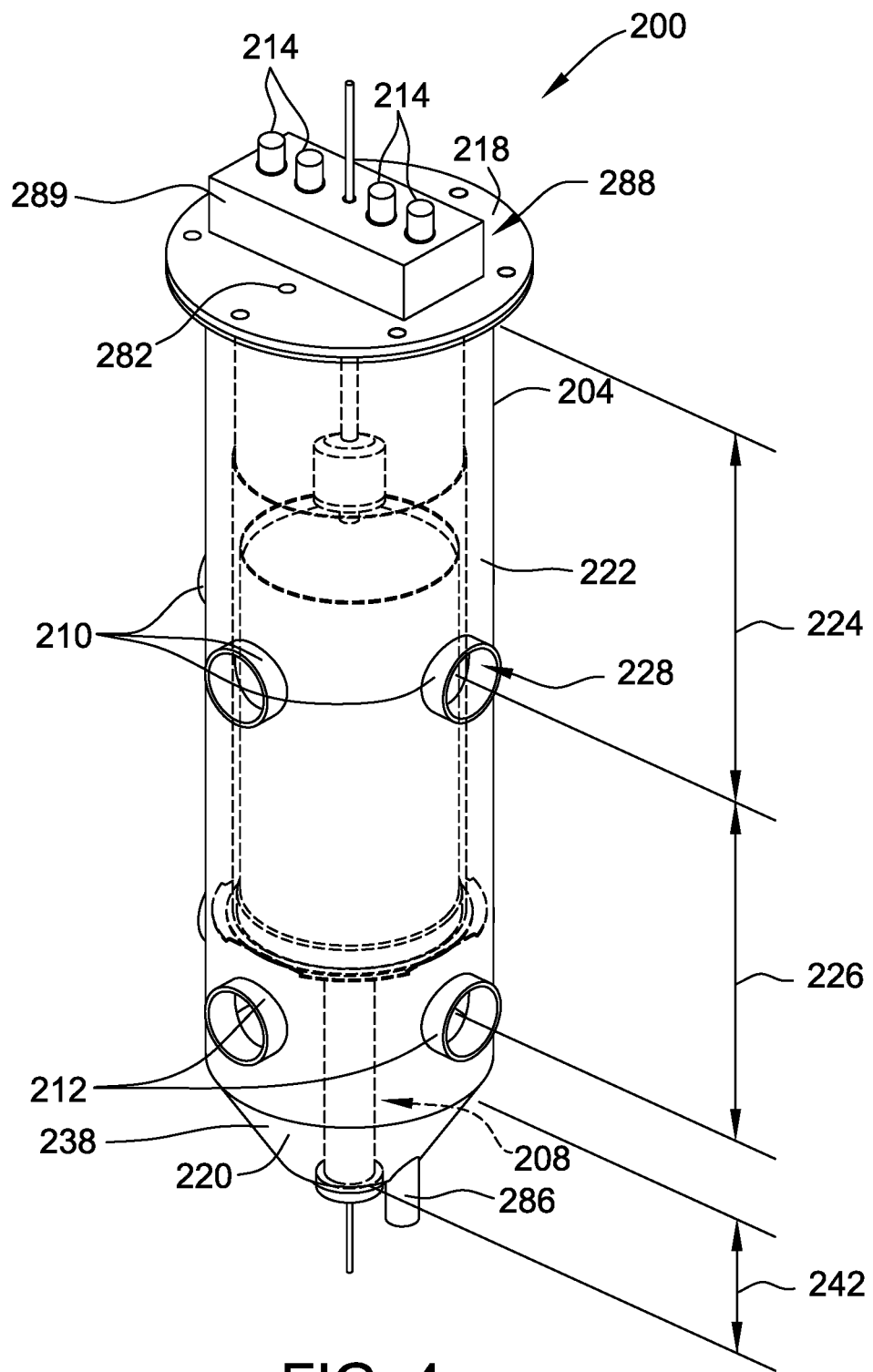
FIG. 4 is a perspective view of a filtering system suitable for use in the fluid application system shown in FIGS. 1 and 2.
Figure 5:
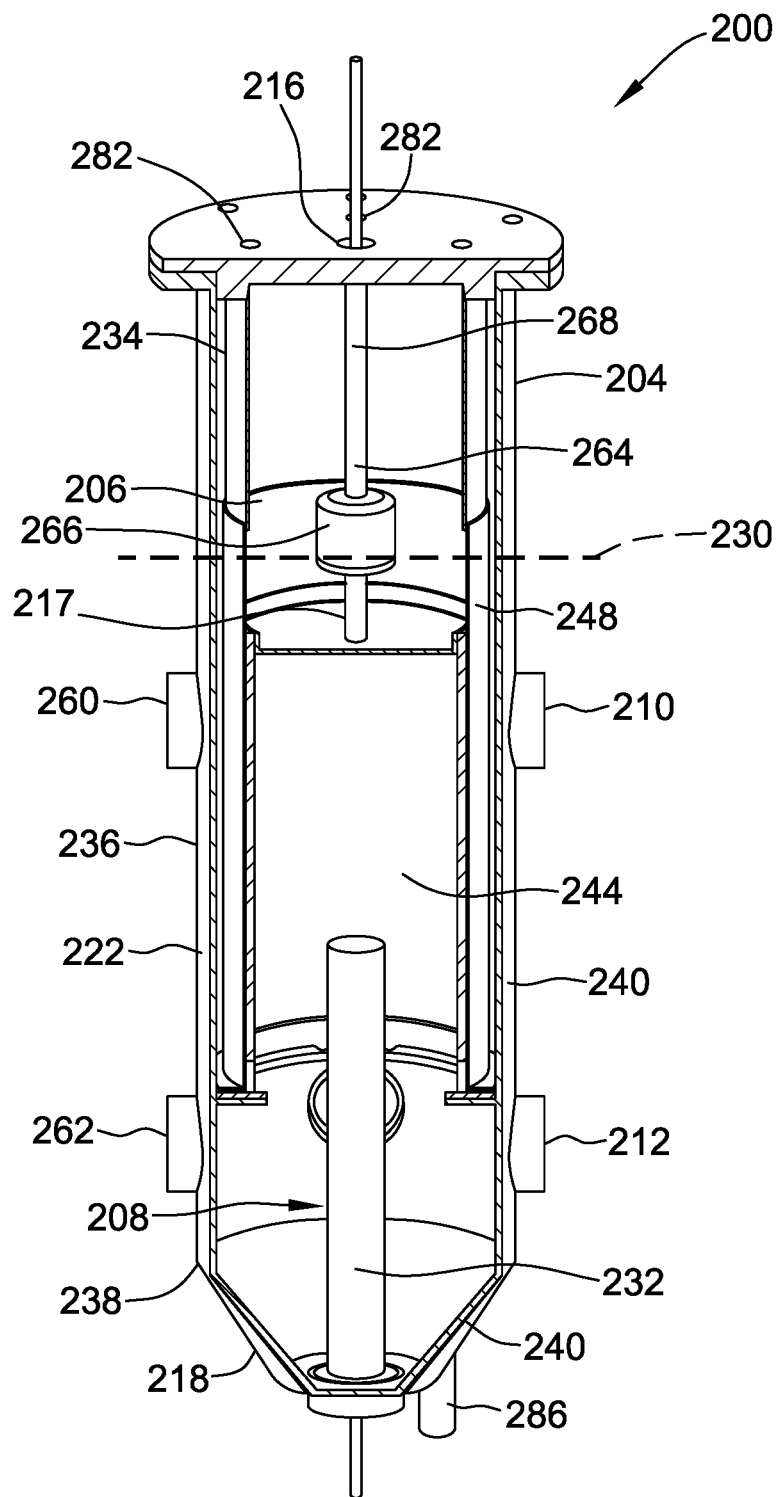
FIG. 5 is a sectional view of the filtering system shown in FIG. 4.

With reference to FIGS. 4 and 5, the filtering system 200 includes a container 204 defining an interior space 206 and a collection mechanism 208 disposed within the interior space of the container. The container 204 is configured to hold an amount of fluid, i.e., a reservoir, in the interior space 206. While in the exemplary embodiment the container 204 is configured to hold a volatile fluid, the container may be configured to hold any fluid without departing from some aspects of this disclosure. The container 204 includes an outlet 210 for fluid to flow out of the interior space 206 and an inlet 212 for fluid to enter the interior space 206. In suitable embodiments, the filtering system 200 may have any outlets 210 and inlets 212 that enable the filtering system 200 to function as described herein.

The container 204 may be constructed from any suitable materials. For example, the container 204 may be constructed from a stainless steel pipe such as a schedule 20 stainless steel pipe having an 8-inch diameter. In other embodiments, the filtering system 200 may include any container that enables the filtering system 200 to function as described herein.

As shown in FIGS. 4-5, the filtering system 200 includes a plurality of the inlets 212 for fluid to enter the container 204 and a plurality of the outlets 210 for liquid to exit the container 204. In the illustrated embodiment, the container 204 includes four inlets 212 and four outlets 210. Accordingly, the filtering system 200 may be connected in fluid communication with a plurality of fluid storage tanks 104 (shown in FIG. 1). For example, the filtering system 200 may be connected to the fluid storage tanks 104 such that each fluid storage tank 104 is connected to two inlets 212 and two outlets 210. Accordingly, the filtering system 200 facilitates reducing downtime of the fluid application system 100 by allowing use of multiple fluid storage tanks 104 simultaneously, thereby enhancing the effective capacity of the fluid application system. In addition, the inlets 212 and the outlets 210 reduce the possibility of fluid flow through the filtering system 200 being obstructed.

The inlets 212 are positioned such that fluid enters the interior space 206 and flows towards the outlets 210. In the exemplary embodiment, the inlets 212 are positioned below the outlets 210 such that fluid flows upwards towards the outlets. The upward flow of fluid facilitates the collection mechanism 208 collecting material as described further below. In other suitable embodiments, the filtering system 200 may include any number, including one, of the inlets 212. In some embodiments, the flow rate of the fluid may be a velocity which is less than the percolation speed of vapor entrained within the fluid, and the downward velocity of solid material due to gravitational forces. As a result, vapor will percolate above the liquid and dense, solid material will settle below the liquid.

The filtering system 200 includes at least one vapor valve 214 for controlling the liquid level in the interior space 206 and the fluid flow through the filtering system 200. Each of the vapor valves 214 is positionable between a closed position and an opened position. The opened position allows vapors to be exhausted from the interior space 206, which facilitates fluid flowing into the interior space. The closed position inhibits vapors from being exhausted from the interior space 206 through the vapor valve 214. In suitable embodiments, each of the vapor valves 214 may be positionable in intermediary positions to vary the amount of vapors exhausted from the filtering system 200. In the exemplary embodiment, each of the vapor valves 214 is a pulse-width-modulated solenoid valve. In suitable embodiments, the filtering system 200 may comprise any number of valves of any type that enable the filtering system 200 to function as described herein.

In reference to FIG. 4, the illustrated embodiment includes a valve assembly 288 connected to a top wall 218 of the container 204. The valve assembly 288 includes a plurality of the vapor valves 214. In the illustrated embodiment, each of the vapor valves 214 is a pulse-width-modulated solenoid valve that is controlled by the controller 126 (shown in FIG. 3). Each valve 214 of the valve assembly 288 is individually controlled by the controller 126 and may be positioned between an open position and a closed position. In other embodiments, the filtering system 200 may include any valve that enables the filtering system 200 to function as described herein.

In some embodiments, the vapor valves 214 may be connected directly to the container 204. In the illustrated embodiment, each vapor valve 214 is connected to the container 204 by a manifold 289 that is in fluid communication with the interior space 206. In other embodiments, the vapor valves 214 may be connected to the container 204 in any suitable manner that enables the filtering system 200 to function as described herein.

Figure 10:
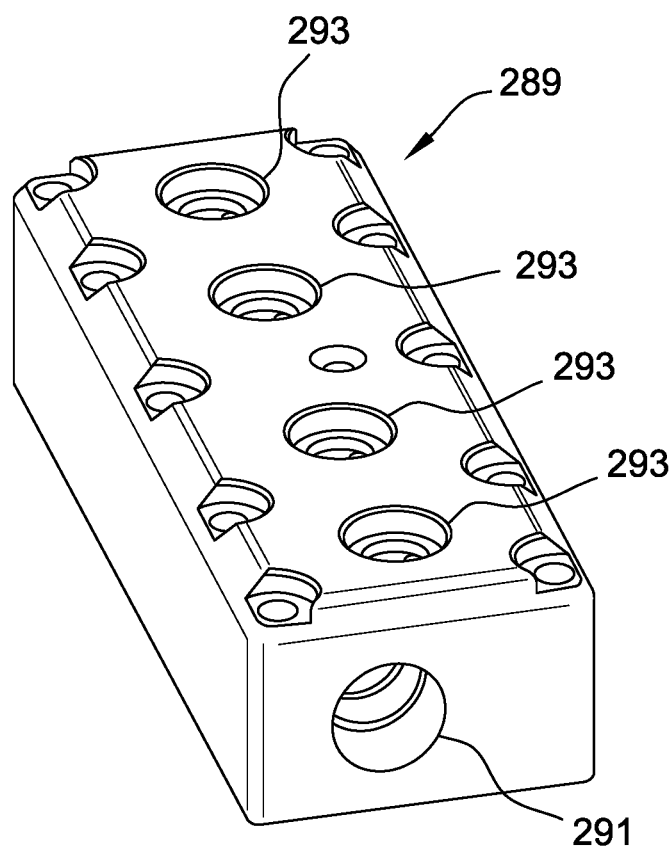
FIG. 10 is a perspective view of an embodiment of a manifold of a valve assembly shown in FIG. 4.

The vapor valves 214 are received in the manifold 289 such that the vapor valves 214 are fluidly connected to ports 282 in the top wall 218 and are in fluid communication with the interior space 206 via an internal passage 291 (FIG. 10)

defined by the manifold 289. Accordingly, the vapor valves 214 are adjacent an upper portion 234 of the container 204 and are configured to exhaust vapor that is located in the upper portion 234. In other embodiments, the vapor valves 214 may be connected to any portions of the filtering system 200.

The controller 126 (shown in FIG. 3) is configured to operate the vapor valves 214 in a sequence to regulate the rate and amount of vapor that is released from the filtering system 200. For example, the controller 126 may sequentially activate the vapor valves 214 from closed to open positions to increase the rate at which vapor is exhausted from the filtering system 200. Accordingly, the valve assembly 288 may be used to control the liquid level of fluid within the filtering system 200. Specifically, the release or exhaust rate of vapor from the interior space 206 may be increased or decreased to adjust the liquid level. For example, a first valve 214 may be opened to release vapor at a first exhaust rate. If additional vapor release is desired, a second valve 214 may be opened to increase the rate of vapor release to a second exhaust rate. Likewise, third and fourth valves 214 may be sequentially opened to increase the exhaust rate to a third and fourth exhaust rate, respectively. Alternatively, the vapor valves 214 may be closed in succession to decrease the release of vapor from the interior space 206. In some embodiments, the valve assembly 288 may be controlled based at least in part on sensor data such as the rate of fluid flow and the liquid level of the fluid. In other embodiments, the valve assembly 288 may be controlled in any suitable manner that enables the filtering system 200 to function as described herein. For example, in some embodiments, the vapor valves 214 may be manually controlled.

In some embodiments, the filtering system 200 is configured for handling a volatile nutrient-rich fluid for use as an agricultural fertilizer. Accordingly, the filtering system 200 can include at least one safety device configured for the safe and effective handling of the fluid. The at least one safety device can include at least one of the following: a vent valve, a hydrostatic relief valve, a pressure gauge, an overflow protection device, and a hose breakaway device.

In suitable embodiments, the container 204 may include any walls of any shape that enable the filtering system 200 to function as described herein. In the exemplary embodiment, in reference to the orientation shown in FIG. 5, the container includes the top wall 218, a bottom wall 220, and a sidewall 222 extending between the top wall 218 and the bottom wall 220. In the illustrated embodiment, the sidewall 222 forms a substantially cylindrical shape, the top wall 218 is a circular plate, and the bottom wall 220 is opposite the top wall and forms an inverted cone. The inlet 212 and the outlet 210 are defined by the sidewall 222 intermediate the top wall 218 and the bottom wall 220. In the illustrated embodiment, the outlet 210 is disposed between the top wall 218 and the inlet 212, and the inlet 212 is disposed adjacent the bottom wall 220. In suitable embodiments, the inlet 212 and the outlet 210 may be disposed in any portion of the container 204 without departing from some aspects of this disclosure.

The container 204 is configured to contain a volume of fluid and/or material within the interior space 206. In suitable embodiments, the container 204 may contain any volume that enables the filtering system 200 to function as described herein. For example, in some embodiments, the container 204 may contain a volume in a range of about 1 gallon to about 15 gallons. In further embodiments, the container 204 may contain a volume in a range of about 5 gallons to about 10 gallons. In the illustrated embodiment, the container 204 contains a volume of approximately 6 gallons. The volume of the container 204 reduces the frequency that filtering system 200 is required to be cleaned and/or serviced. For example, in some embodiments, the container 204 has a volume that allows the fluid application system 100 (shown in FIG. 1) to apply fluid to an entire field without the filtering system 200 being cleaned and/or serviced. In addition, the filtering system 200 reduces operator exposure to potentially hazardous materials and reduces the time for treating fields.

With reference now to FIG. 4, the outlets 210 are disposed a distance 224 from the top wall 218. In suitable embodiments, the outlets 210 and inlets 212 may be disposed any distances from each other and from the top wall 218 that enable the filtering system 200 to function as described herein. In some suitable embodiments, the distance 224 may be between about 5 inches and about 20 inches or between about 10 inches and about 15 inches. In the illustrated embodiment, the distance 224 is approximately 12.5 inches. In suitable embodiments, the inlets 212 are disposed a distance 226 below the outlets 210. In some suitable embodiments, the distance 226 may be between about 5 inches and about 20 inches or between about 10 inches and about 15 inches. In the illustrated embodiment, the distance 226 is approximately 12 inches. The distances 224, 226 are measured from respective centers of the outlets 210 and the inlets 212.

In suitable embodiments, the outlets 210 and the inlets 212 may have any shapes and sizes that enable the filtering system 200 to function as described herein. In the illustrated embodiments, each of the outlets 210 and the inlets 212 have a circular shape with a diameter 228. In some suitable embodiments, the diameter 228 may be in a range between about 0.25 inches and about 5 inches or about 1 inch and about 3 inches. In the exemplary embodiment, the diameter 228 is approximately 2 inches. While in the exemplary embodiment all of the outlets 210 and the inlets 212 have similar shapes and sizes, any of the outlets 210 and the inlets 212 may have different shapes and/or sizes without departing from some aspects of this disclosure.

Also, in suitable embodiments, any suitable fluid lines may be connected to the outlets 210 and the inlets 212. For example, the fluid lines may be about 1 inch or about 1.25 inches or about 1.5 inches. In some embodiments, a bushing or reducer may be used to connect the fluid lines to the outlets 210 and the inlets 212.

In some embodiments, the filtering system 200 includes at least one injection port 216 for injecting material into the interior space 206. In addition, the filtering system 200 may include an injection device 217 that extends through the injection port 216 and is configured to dispense material into interior space 206. Suitably, the injection port 216 and the injection device 217 are positioned and configured such that material injected through the injection device 217 is substantially uniformly distributed throughout the interior space 206 and evenly available to the plurality of outlets 210. For example, in the illustrated embodiment, the injection port 216 is in the top wall 218 and the injection device 217 extends through the top wall 218. Accordingly, material injected by the injection device 217 may bypass a filter included in the filtering system 200. As a result, the amount of material required to treat the fluid may be reduced. In the illustrated embodiment, the injection device 217 is connected to the float sensor 264 and is positioned along a center axis of the filtering system 200. As a result, material injected by the injection device 217 is evenly distributed within the interior space 206. In suitable embodiments, the filtering system 200 may include any number of the injection ports 216 and injection devices 217. In some embodiments, the injection port 216 and/or injection device 217 may be omitted without departing from some aspects of this disclosure.

The injection device 217 may be used to inject additives into the fluid within the interior space 206. For example, in some embodiments, the additives include stabilizers that neutralize pests that may degrade the fluid applied by the fluid application system 100 (shown in FIG. 1). In some embodiments, at least a portion of the additives may be added to the fluid in other portions of the fluid application system 100, such as the fluid storage tank 104 (shown in FIG.

In operation, fluid within the interior space 206 includes vapor and liquid separated such that at least a portion of the vapor is disposed above the liquid in reference to the orientation of the container 204 shown in FIG. 5. A sensor senses the level of the liquid in the container 204 and sends the information to the controller 126. The controller 126 can determine diagnostic data, such as defining a liquid plane 230 and relating the level of the liquid to the liquid plane. In the exemplary embodiment, the liquid plane 230 is defined through a portion of the container 204 above the outlets 210. Suitably, the level of the liquid is maintained at or above the liquid plane such that the liquid is available to be dispensed through the outlets 210. In the exemplary embodiment, the vapor valves 214 of the filtering system 200 facilitate controlling the level of the liquid within the interior space 206. The controller 126 controls the vapor valves 214 such that vapor is released through the vapor valves at a rate sufficient to maintain the liquid level above the liquid plane. As described in more detail below, the controller 126 may control the vapor valves 214 based on information received from at least one sensor connected to the controller 126. For example, the controller 126 may control one or more of the vapor valves 214 based on the liquid level sensed by a sensor within the interior space 206. In some embodiments, one or more of the vapor valves 214 may be directly responsive to a sensor without input from the controller 126. For example, the vapor valves 214 may be pulse-width-modulated solenoid valves that are connected to a float switch such that the valves moves between opened and closed positions as the float switch moves with the liquid level.

In some embodiments, the controller 126 sends a signal to one or more of the vapor valves 214 to move the valves to the opened position when the controller determines vapor needs to be released to maintain a desired position of the liquid level. When the liquid level is determined to be at a desired position, the controller 126 may send a signal to one or more of the vapor valves 214 to move the valves to the closed position. In some embodiments, the controller 126 may send signals to one or more of the vapor valves 214 to move the valves 214 to intermediary positions to maintain the liquid level at the desired position.

The collection mechanism 208 is disposed within the interior space 206 intermediate the inlet 212 and the outlet 210. As fluid flows through the interior space 206 towards the outlet 210, the collection mechanism 208 is configured to collect materials carried by the fluid. For example, the collection mechanism 208 may be configured to collect ferrous materials in the fluid. In the exemplary embodiment, the collection mechanism 208 is configured to at least partially release collected material in response to a signal from the controller 126. In some suitable embodiments, the controller 126 may be configured to send a signal to the collection mechanism to release at least some of the collected material when one or move vapor valves 214 is moved to the closed position to shut off fluid flow through the interior space 206. As a result of releasing material, the collection mechanism 208 is at least partially cleared and ready to collect additional material. In some embodiments, the collection mechanism 208 resumes collecting material when one or more of the vapor valves 214 is moved to the opened position. In further embodiments, the collection mechanism may be configured to collect material upon receiving a signal from the controller and/or after cycling through a release state for a predetermined time period.

In operation, the fluid flows from the inlet 212 towards the outlet 210 and carries materials. As the materials pass the collection mechanism 208, which is at least partially disposed between the inlet 212 and the outlet 210, the materials are attracted to and retained by the collection mechanism. The collection mechanism 208 is configured to release material such that the material moves within the container 204 and/or is ejected from the container at desired times. For example, the collection mechanism 208 may be configured to release material when the fluid flow stops or slows. In some embodiments, control of collection mechanism 208 is coordinated with control of valve 136 (shown in FIG. 1) such that collection mechanism 208 releases material when valve 136 slows or stops fluid flow through filtering system 200. The released material may move to a portion of the interior space 206 below the inlet 212 such that the materials are not swept up in the fluid when the fluid flow increases in velocity.

In suitable embodiments, the collection mechanism 208 may include any components that enable the collection mechanism 208 to function as described herein. In the exemplary embodiment, the collection mechanism 208 includes an electromagnet 232 for attracting ferrous material. The electromagnet 232 is connected to a power supply (not shown) which supplies an electric current to the electromagnet 232 to generate magnetic attractive forces and collect the ferrous material. The current supplied to the electromagnet 232 may be controlled by the controller 126 such that the electromagnet 232 can be activated and deactivated, and/or the strength of the magnetic field generated by the electromagnet 232 can be modulated. Accordingly, the collection mechanism 208 can be cycled through periods of collection and release by controlling the current through the electromagnet 232. In some embodiments, the electric current may be weakened for periods of time such that the electromagnet releases some material, while some material may be retained by the electromagnet. In the exemplary embodiment, the electromagnet 232 comprises a substantially cylindrical body projecting upwards from the bottom wall 220 towards the top wall 218. Suitably, the electromagnet 232 extends at least partially above the inlet 212 to facilitate the electromagnet collecting material from fluid that flows into the interior space 206 through the inlet 212. In suitable embodiments, the electromagnet 232 may be disposed anywhere in the interior space 206 without departing from some aspects of this disclosure.

In the exemplary embodiment, the controller 126 is configured to determine, based on the current and voltage flowing through the electromagnet 232, when the collection mechanism 208 has collected a specified amount of material. The current and voltage decreases as the collection mechanism 208 collects material. Accordingly, the controller 126 correlates the current and voltage to the amount of material on the collection mechanism 208. When the current and/or voltage reaches a set value, the controller 126 determines the collection mechanism 208 has collected a predetermined amount of material and can respond accordingly. For example, when the controller 126 determines that the current and voltage flowing through the electromagnet 232 is insufficient to collect additional material, the controller may cause the collection mechanism 208 to be cleared and/or indicate to the operator that the collection mechanism needs to be cleared. In some embodiments, the collection mechanism 208 may include a sensor configured to detect the amount of current and voltage through the electromagnet. For example, in some embodiments, the collection mechanism includes a shunt resistor for determining current through a circuit.

In suitable embodiments, the released material is inhibited from escaping the interior space 206. For example, in some embodiments, released material gathers in a storage area such that the material can be easily removed and cleared. In other embodiments, the released material may be directly exhausted from the fluid application system 100. For example, the collected material may be discharged from a port (not shown) onto the ground below the fluid application system 100. In some embodiments, the filtering system 200 may include an actuator that is controlled by an operator for manually removing material from the fluid application system 100. In further embodiments, the filtering system 200 may be configured to automatically release material from the fluid application system to the surrounding environment.

With reference to the orientation shown in FIG. 5, the container 204 has the upper portion 234, a middle portion 236, and a lower portion 238. The middle portion 236 is disposed between the upper portion 234 and the lower portion 238. In suitable embodiments, the upper portion 234, the middle portion 236, and the lower portion 238 of the container 204 may be positionable in relation to each other to facilitate removing the collected material from the interior space 206 and/or performing maintenance on the container 204 and collection mechanism 208. For example, the upper portion 234 and/or the lower portion 238 of the container 204 may be positionable in relation to middle portion 236 of the container such that the interior space 206 can be accessed. The upper portion 234, the middle portion 236, and the lower portion 238 may be connected by any suitable coupling mechanisms that enable the container 204 to function as described herein. For example, a hinge may connect at least two of the upper portion 234, the middle portion 236, and the lower portion 238 together such that the portions pivot between an opened position and a closed position.

In the illustrated embodiment, the top wall 218 may be removed from the sidewall 222 to access the interior space 206. Accordingly, the interior space 206 can be accessed without disconnecting the filtering system 200 from other components of the fluid application system 100 (shown in FIG. 1) such as fluid lines. As a result, the time to service and/or clean the filtering system 200 is reduced. In addition, the operator exposure to fluid, such as when the fluid lines are disconnected and reconnected to filtering system 200, is reduced. Alternatively, or in addition, the lower portion 238 may be disconnected from the middle portion 236, such as by unscrewing the lower portion 238 from the middle portion 236, to provide access to the interior space 206.

As shown in FIG. 4, in the illustrated embodiment, the lower portion 238 has an at least partially angled portion 240. As the angled portion 240 extends from the middle portion 236 to the bottom wall 220, the angled portion angles toward the centerline of the container 204. In suitable embodiments, the angled portion 240 extends any suitable distance. For example, the angled portion 240 may extend a distance 242 in the direction of the centerline of the container 204 in a range between about 1 inch and about 10 inches or between about 2 inches and about 5 inches. In the illustrated embodiment, the angled portion 240 extends a distance 242 of approximately 3.5 inches parallel to the centerline of the container 204.

The filtering system 200 further includes a filter screen 244 to facilitate the removal of material from fluid in interior space 206. In suitable embodiments, the filter screen 244 is a perforated sheet spaced from the sidewall 222 and disposed intermediate the inlets 212 and the outlets 210. The filter screen 244 is configured such that fluid can flow through the perforations in the filter screen. As the fluid flows through the perforations, the material in the fluid is retained against the filter screen 244, which facilitates removal of the material from the fluid. In some embodiments, when the fluid flow decreases in velocity, the material may move away from the filter screen 244 and may gather in a portion of the interior space 206 where the material is retained when fluid flow resumes and/or may be ejected from the interior space. In some embodiments, at least some of the material may be retained against the filter screen until a cleaning operation is performed.

Suitably, the filter screen has a thickness of between about 0.7 mm (0.03 in.) and about 6.5 mm (0.26 in.). In the illustrated embodiment, the filter screen has a thickness of approximately 1.6 mm (0.06 in.). Suitably, the filter screen has perforations with widths of between about 1.6 mm (0.06 in.) and about 25 mm (1 in.). In the illustrated embodiment, the filter screen has perforations with widths of approximately 3.6 mm (0.1 in.) In suitable embodiments, the filter screen 244 is any material that enables the filtering system 200 to function as described herein. In the exemplary embodiment, the filter screen 244 is a material suitable to withstand the properties of a volatile fluid such as anhydrous ammonia. For example, the filter screen 244 may be plastics, metals, and combinations thereof. In the illustrated embodiment, the filter screen 244 is stainless steel. In suitable embodiments, a filter media is disposed adjacent the filter screen 244 to facilitate removing material from the fluid. The filter media may be any filter media that enables the filtering system 200 to function as described herein. For example, the filter media may be plastics, fibrous material, granular material, and combinations thereof. In the example embodiment, the filter media includes a polypropylene or nylon bag having relatively fine openings, e.g., openings having a width of less than approximately 100 microns.

The filter screen 244 and the filter media are configured to facilitate collection and removal of materials. Suitably, the filter screen 244 and the filter media may be shaped to direct the materials in a desired direction. For example, the filter screen 244 and/or the filter media may be cone-shaped such that material is directed to the center of the filter screen 244 and/or the filter media. In suitable embodiments, the filter screen 244 and the filter media may have any shapes that enable the filtering system 200 to function as described herein.

Figure 6:
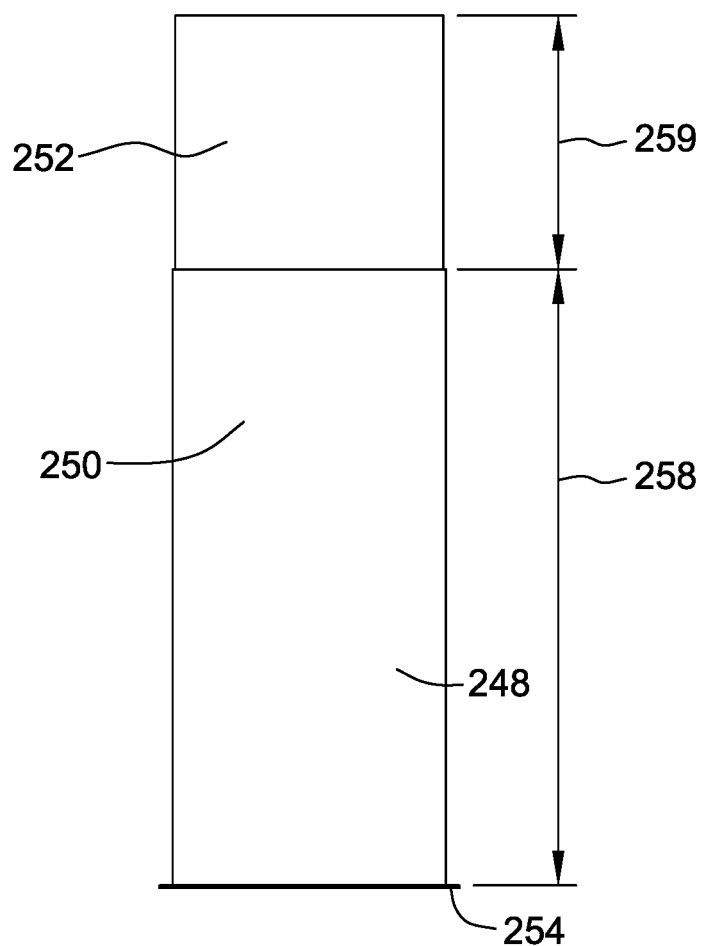
FIGS. 6-8 are side views of portions of the filtering system shown in FIG. 5.

As shown in FIG. 5, a separator or baffle 248 is disposed between the filter screen 244 and the sidewall 222 of the container 204. The separator 248 facilitates separating the fluid into liquid and vapor. In the exemplary embodiment, as shown in FIG. 6, the separator includes a wall 250 that is substantially impervious to fluid, a perforated portion 252 that is at least partially open for fluid to flow through, and a lip 254 extending between the wall 250 and the container 204. The perforated portion 252 extends between the wall 250 and the upper portion 234 and supports the wall 250. The separator 248 defines an inner space for channeling fluid. While in the illustrated embodiment the separator 248 has a cylindrical shape, it is understood that the separator may have any shape that enables the separator to function as described herein. In suitable embodiments, the separator may be made from any material that enables the separator 248 to function as described herein. In the illustrated embodiment, the separator 248 is made of 16-gage steel.

In operation, fluid flow is directed to the inner space of the separator 248 and channeled within the wall 250. As the fluid flows through the inner space of the separator 248, the velocity is decreased and the fluid is separated into liquid and vapor because the vapor rises at a faster rate than the liquid. When fluid reaches the perforated portion 252, the fluid flows through the openings in the perforated portion. The liquid flows along the exterior of the wall 250 and is, thereby, directed to the outlets 210. The vapor remains in the upper portion 234 of the container 204. In suitable embodiments, the separator 248 may have any solid and perforated portions and/or be configured in any suitable manner without departing from some aspects of this disclosure.

In reference to FIG. 6, the perforated portion 252 has openings that cover a percentage in a range between about 50% and about 90% of the perforated portion. In the exemplary embodiment, openings cover approximately 80% of the perforated portion 252. In some suitable embodiments, the wall 250 has a height 258 in a range between about 5 inches and about 25 inches or between about 10 inches and about 20 inches. In the exemplary embodiment, the wall 250 has the height 258 of approximately 15 inches. In some suitable embodiments, the perforated portion 252 has a height 259 in a range between about 1 inch and about 25 inches or between about 4 inches and about 10 inches. In the exemplary embodiment, the perforated portion 252 has the height 259 of approximately 6.5 inches.

In suitable embodiments, the filtering system 200 may include any number of sensors. The sensors may be any devices for sensing a characteristic of the filtering system 200. For example, the sensors may include at least one of the following: a float, a capacitive device, a pressure sensor, a temperature sensor, a density sensor, a valve position sensor, a valve voltage sensor, a valve current sensor, a valve duty cycle sensor, a valve orifice measurement device, a flow sensor, and a flow switch. The sensors may be connected to the controller 126 such that the sensors send signals to and receive signals from the controller. The signals may include information relating to any characteristics of the filtering system 200 such as, without limitation, pressures, temperatures, duty cycles, densities, valve positions, geographic position system (GPS) data, and any other suitable characteristics of the filtering system 200.

For example, in the illustrated embodiment, the filtering system 200 includes a first pressure sensor 260 and a second pressure sensor 262. The first and second pressure sensors 260, 262 are connected to and send signals to the controller 126. The signals can include information relating to the pressure in interior space 206. The first pressure sensor 260 is positioned downstream from the outlet 210 and configured to measure a pressure of the fluid downstream from the outlet. The second pressure sensor 262 is positioned upstream from the outlet 210 and configured to measure a pressure upstream from the outlet. As a result, controller 126 can determine a pressure difference between fluid upstream from the outlet 210 and fluid downstream from the outlet. Based at least in part on the sensed pressures and/or the determined pressure difference, the controller 126 can determine whether a substantial amount of liquid is disposed above the outlets 210 and can perform a function, as described in detail above. In some suitable embodiments, the sensed pressures may facilitate determining other characteristics of the filtering system 200, such as flow rate through interior space 206.

As shown in FIG. 5, the filtering system 200 further includes a float sensor 264. The float sensor 264 includes a float 266 and a support 268, which are shown individually in FIGS. 7 and 8, respectively. The float 266 is sufficiently buoyant to float on the surface of liquid and is movable in relation to the top wall 218. Accordingly, during operation of the filtering system 200, the float 266 is positioned on the surface of liquid within the interior space 206 and can be used to determine the liquid level. The float 266 is rigidly attached to the support 268 such that the support moves with the float. Accordingly, the liquid level may be determined by the position of the support 268 and/or float 266 in relation to the top wall 218. In some embodiments, the float sensor 264 may include mechanisms for automatically sensing the position of the support 268 and/or float 266 in relation to the top wall 218.

Figure 7:
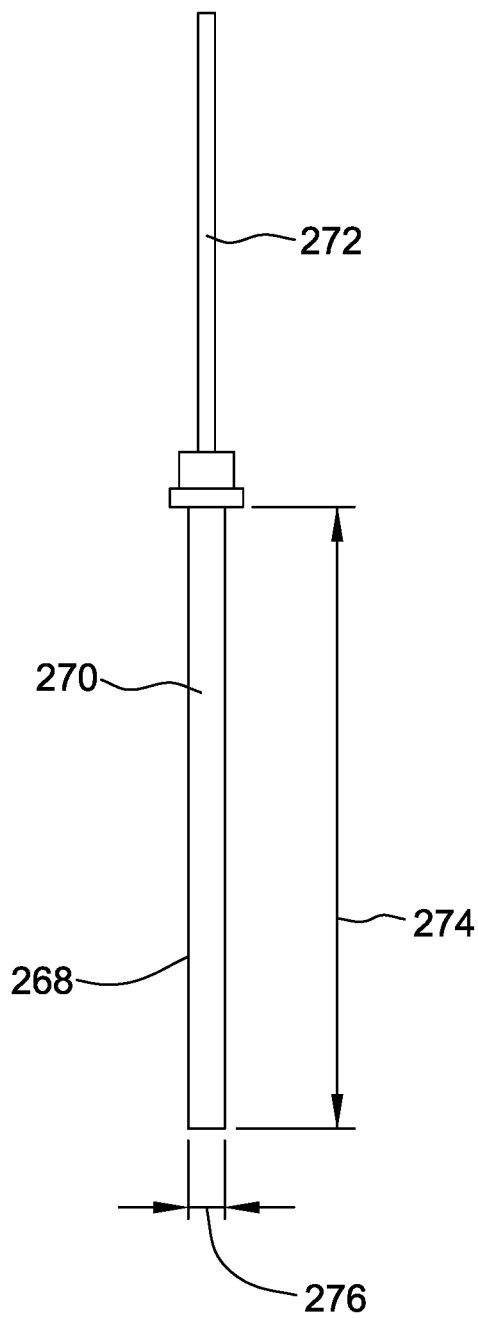

As shown in FIG. 7, the support 268 has a body 270 connected to a wire lead 272. In other embodiments, the float sensor 264 may be wireless. In suitable embodiments, the body 270 may be any shape and size that enables the float sensor 264 to function as described herein. For example, the body 270 may have a length 274 in a range between about 1 inch and about 25 inches or between about 5 inches and about 10 inches. The body 270 may have a maximum width 276 in a range between about 0.125 inches and about 5 inches or between about 0.25 inches and about 2 inches. In the exemplary embodiment, the body 270 has a length 274 of approximately 8.5 inches and a maximum width 276 of approximately 0.5 inches. While in the illustrated embodiment the body 270 is substantially cylindrical, it is understood that the body 270 may have any shape without departing from some aspects of this disclosure.

Figure 8:
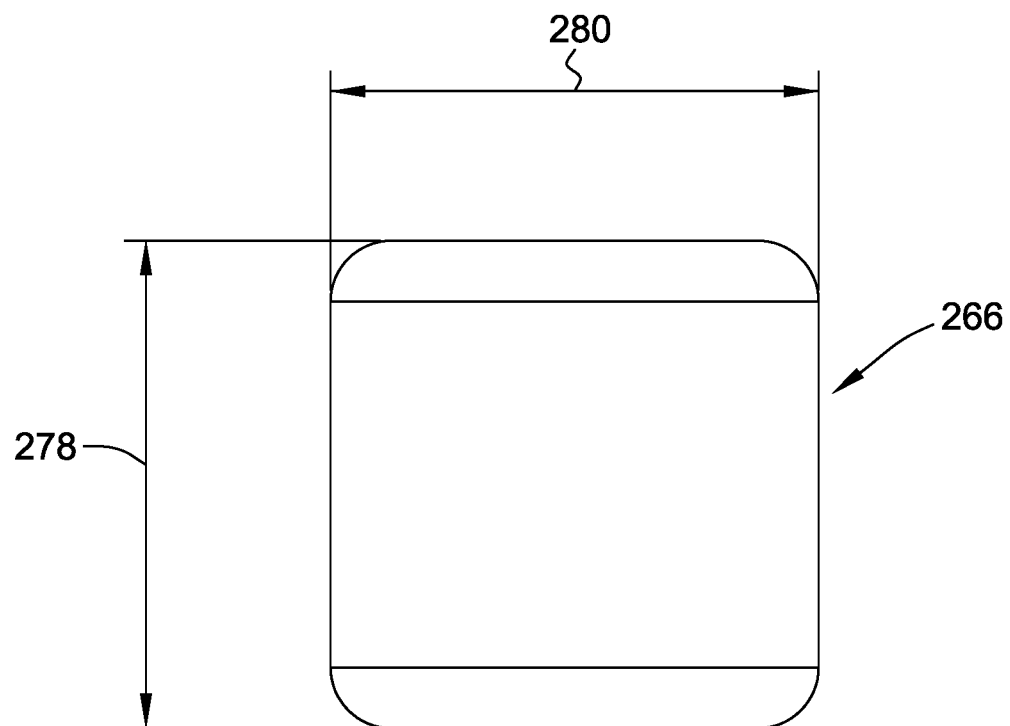

As shown in FIG. 8, the float 266 has a height 278 and a width 280. In suitable embodiments, the height 278 and width 280 may be any measurements that enable the float 266 to function as described herein. For example, the height 278 may be in a range between about 0.125 inches and about 10 inches or between about 1 inch and about 5 inches. In the exemplary embodiment, the height 278 is approximately 2 inches. The width 280 may be in a range between about 0.125 inches and about 10 inches or between about 1 inch and about 5 inches. In the exemplary embodiment, the width 280 is approximately 2 inches. While in the illustrated embodiment the height 278 and the width 280 are substantially equal, it is understood that the height 278 and the width 280 may be unequal without departing from some aspects of this disclosure. In the illustrated embodiment, the float 266 is substantially cube-shaped with rounded ends, which simplifies manufacturing and assembly. In other embodiments, the float 266 may have any shape that enables the float to function as described herein. For example, in some embodiments, the float 266 may be substantially spherical.

In addition to or as an alternative to the float sensor 264, the filtering system 200 may include a first liquid presence sensor (not shown) and a second liquid presence sensor (not shown). The first liquid presence sensor may be positioned above the second liquid presence sensor. Accordingly, the liquid presence sensors can be used to determine if a liquid is at a desired level in relation to the liquid presence sensors. For example, the first and second liquid presence sensors can be used to determine if liquid is at a level above or below the liquid plane which may be defined between the first and second liquid presence sensors.

Figure 9:
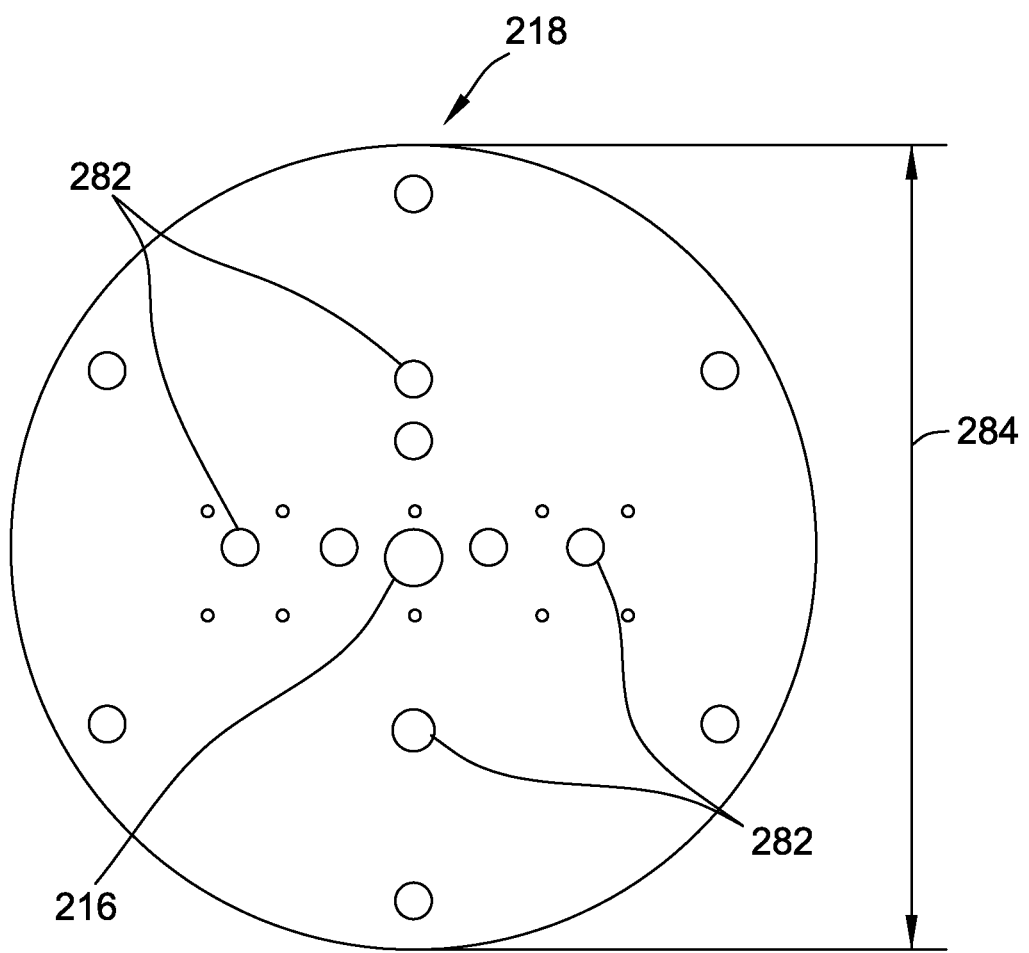
FIG. 9 is a top view of a portion of the filtering system shown in FIG. 5.

As shown in FIG. 9, the top wall 218 includes a plurality of ports 282. The ports 282 may be any suitable ports that enable the filtering system 200 to function as described herein. The ports 282 facilitate attaching components to the filtering system 200 such that the components are fluidly connected to the interior space 206. For example, in some suitable embodiments, at least one of the following may be attached to the filtering system 200 and fluidly communicate with the interior space 206 via the ports: a manifold (such as manifold 289), a bleeder valve, a pressure relief valve, and a pulse-width-modulated valve (such as vapor valve 214). In some embodiments, the ports 282 facilitate removal or exhausting of vaporized fluid from within the interior space 206. The ports 282 may have any size and shape. In the illustrated embodiment, the ports 282 are at least partially circular with a diameter between about 0.1 in. and about 1.2 in. In the illustrated embodiment, at least some of the ports 282 are threaded ports having a size of approximately 0.25 in. according to national pipe thread (NPT) standards.

In suitable embodiments, the top wall 218 may be any shape and size that enable the filtering system 200 to function as described herein. In the exemplary embodiment, the top wall 218 has a substantially circular shape with a diameter 284. The diameter 284 may be any length. For example, the diameter 284 may be in a range between about 5 inches and 25 inches or in a range between about 10 inches and about 15 inches. In the illustrated embodiment, the diameter 284 is approximately 11 inches.

As shown in FIGS. 3 and 4, the filtering system 200 further includes a drain port 286 for draining fluid from the interior space 206. Suitably, the drain port 286 is disposed in the bottom wall 220. In suitable embodiments, the drain port 286 may have any configuration that enables the filtering system 200 to function as described herein. For example, the drain port 286 may have a diameter in a range between about 0.125 inch and about 5 inches. In some embodiments, the drain port 286 may have a length in a range between about 0.25 inches and about 10 inches. In the exemplary embodiment, the drain port 286 has a length of approximately 1.5 inches and a diameter of approximately 0.25 inches.

FIG. 10 is a perspective view of the manifold 289 of the valve assembly 288 (shown in FIG. 4). The manifold 289 is configured to receive a plurality of the vapor valves 214 (shown in FIG. 4). In the exemplary embodiment, the manifold 289 defines an interior passage 291 and a plurality of cavities 293 in fluid communication with the internal passage 291. The cavities 293 are configured to receive the vapor valves 214. The manifold 289 also includes at least one outlet (not shown) on a bottom surface of the manifold 289 that fluidly connect the interior passage 291 to one or more of the ports 282 defined in the top wall 218.

In the illustrated embodiment, the manifold 289 has a rectangular cuboid shape. The manifold 289 is configured to be fastened to the filtering system 200 such that the bottom surface of the manifold 289 contacts top wall 218 (shown in FIG. 9), and such that the outlets of the manifold 289 are aligned with corresponding ports 282 defined by the top wall 218. In other embodiments, the manifold 289 may be coupled to any portion of the filtering system 200.

Figure 11:
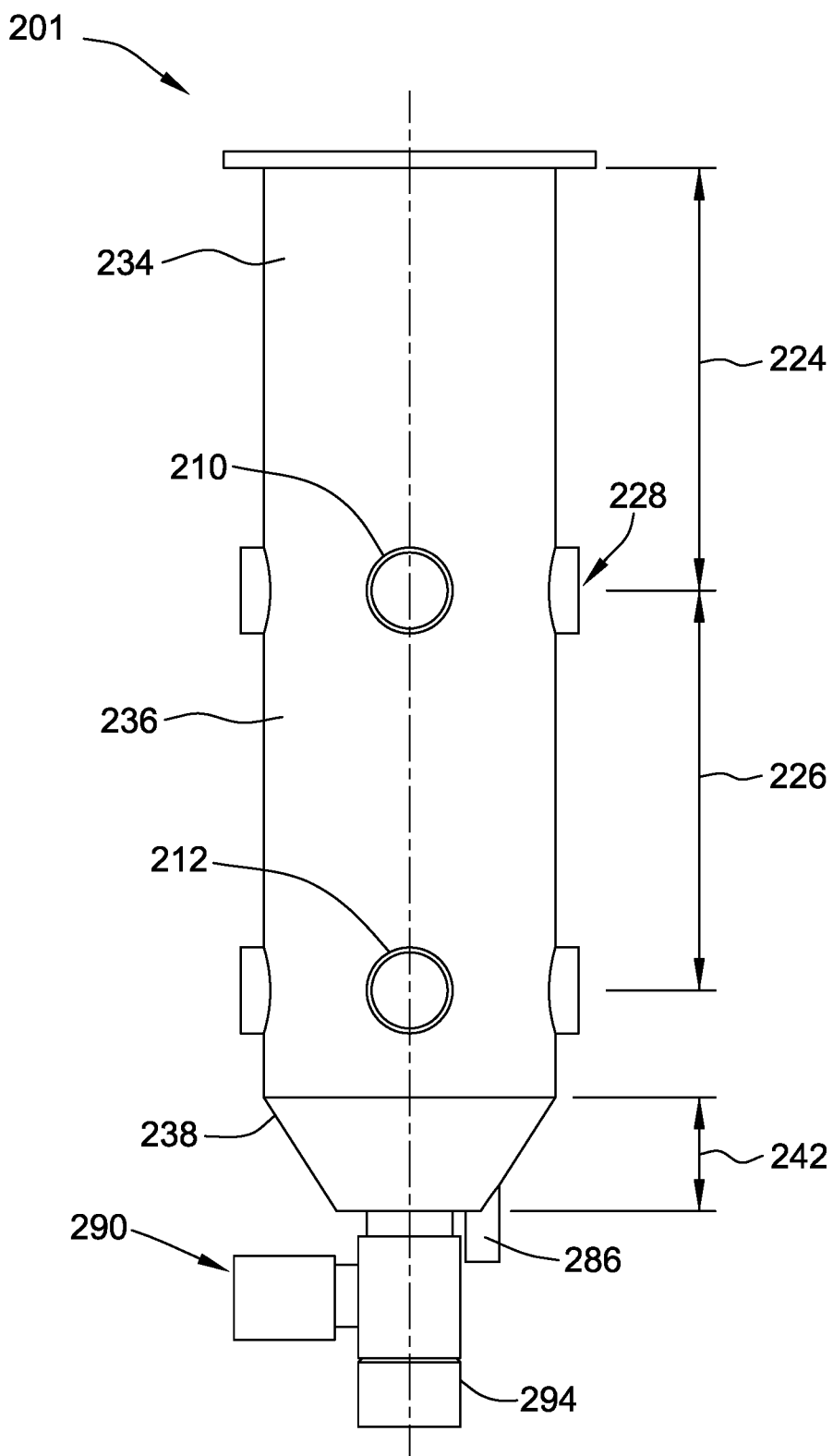
FIG. 11 is a side view of another embodiment of a filtering system suitable for use in the fluid application system shown in FIGS. 1 and 3.
Figure 12:
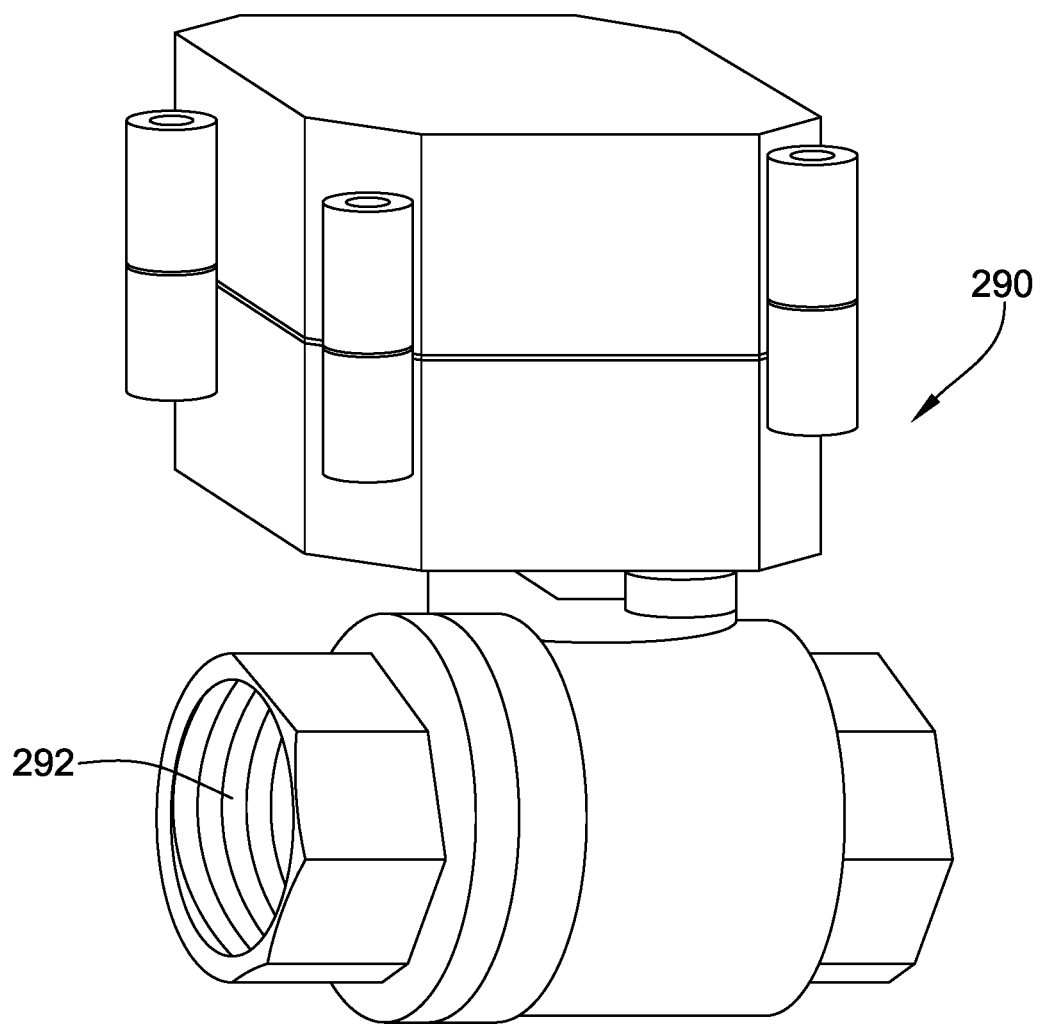
FIGS. 12-13 are perspective views of portions of the filtering system shown in FIG. 11.
Figure 13:
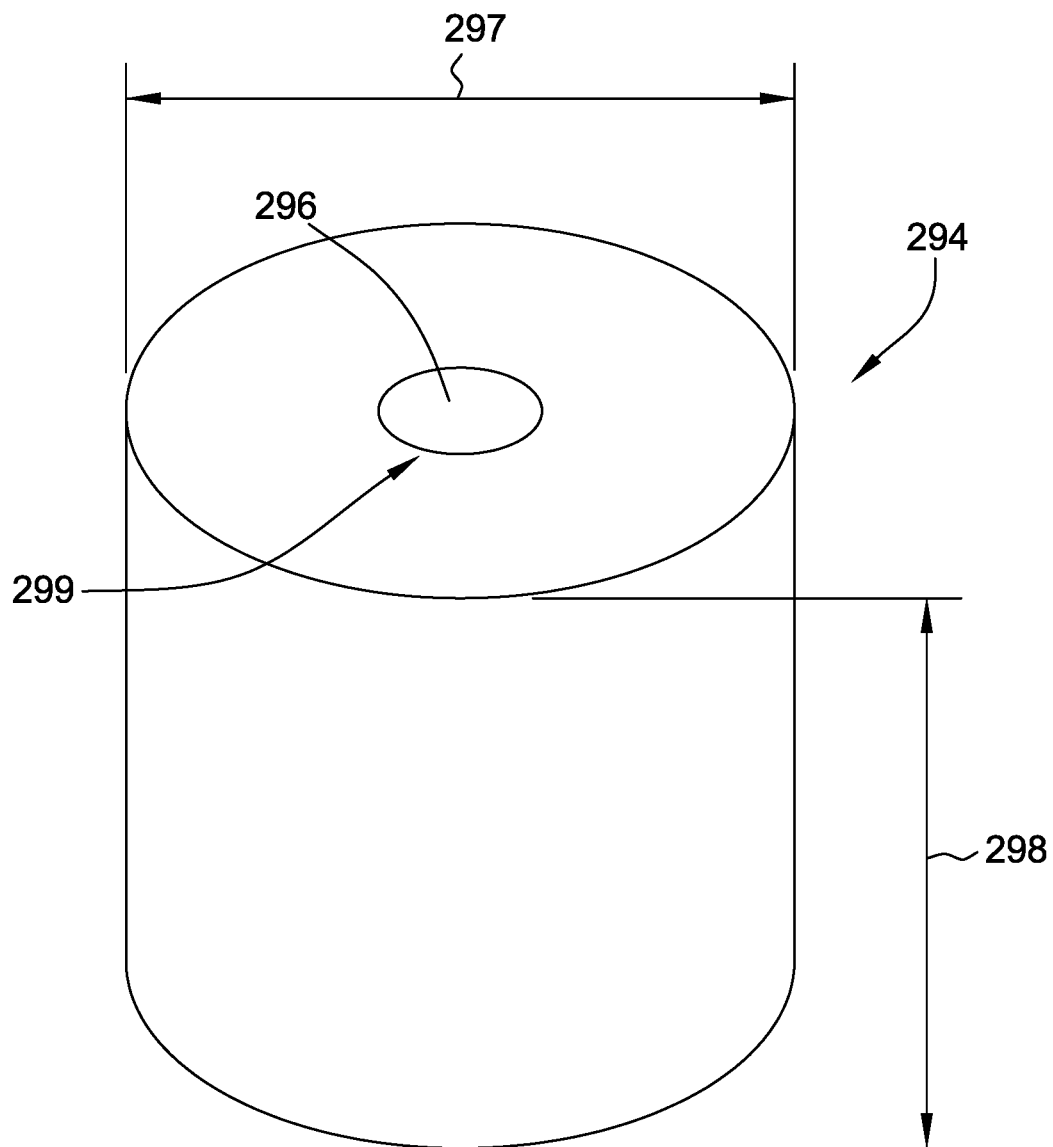

FIGS. 11-13 illustrate another embodiment of a filtering system indicated generally by the reference number 201. Components of the filtering system 201 that are the same as the components of the filtering system 200 are identified with like reference numerals. The filtering system 201 is similar to the filtering system 200 except the filtering system 201 is configured to dispense material from the interior space 206 to a casing 290. In other suitable embodiments, material may be removed from the filtering system 201 in any suitable manner that enables the fluid application system 100 to function as described herein.

As shown in FIG. 11, the casing 290 is connected to the container 204 and configured to collect the material removed from the fluid. In reference now to FIG. 12, the casing 290 defines a cavity 292 in fluid communication with the interior space 206 such that fluid and material can move between the interior space 206 and the cavity. A seal separates the cavity 292 and the interior space 206 and is selectively positionable between an opened position where the fluid and material is allowed to move between the interior space and the cavity and a closed position where the fluid and material is inhibited from moving between the interior space and the cavity. In some embodiments, the seal may be configured to cycle between the closed position and the opened position. Suitably, the casing 290 is configured to facilitate removal of the material while the seal is in the closed position. For example, the casing 290 may be configured to release material from the cavity 292 to the surrounding environment when the seal cycles to the closed position. In some suitable embodiments, the casing 290 includes a valve that cycles between the opened and closed positions to release material from the cavity. In some embodiments, the system 100 further includes an output device configured to output a visually-and/or audibly-perceptible warning or alarm to indicate that a release of material and volatile fluid from cavity 292 is imminent. The output device is communicatively coupled to controller 126, and may be mounted to system 100 at any suitable location that enables the alarm to be perceived by persons in the vicinity of filtering system 200. In some embodiments, for example, the output device is mounted on or near a rear of vehicle 102. The output device may include any suitable device that enables the output device to function as described herein, including, for example and without limitation, speakers and lights.

In reference to FIGS. 12 and 13, a collector 294 is connected to the casing and defines an interior 296 separated from the cavity 292 by a seal. The seal is positionable between an opened position and a closed position. The collector 294 may have any suitable shape that enables the collector to function as described herein. In the illustrated embodiment, the collector 294 is substantially cylindrical with a diameter 297 and a height 298. In some suitable embodiments, the diameter 297 is in a range between about 1 inch and about 20 inches or between about 2 inches and about 6 inches. In the exemplary embodiment, the diameter 297 is approximately 4 inches. In some suitable embodiments, the height 298 is in a range between about 1 inch and about 20 inches or between about 2 inches and about 6 inches. In the exemplary embodiment, the height 298 is approximately 4 inches. A port 299 is defined in the top of the collector 294 for connecting to the casing 290. In suitable embodiments, the port 299 is any size. In the exemplary embodiment, the port 299 is a threaded port having a size of approximately 1 in. according to national pipe thread (NPT) standards. In further suitable embodiments, a vent is connected to the cavity to release vapor to one of a ground engagement device and the atmosphere.

Figure 14:
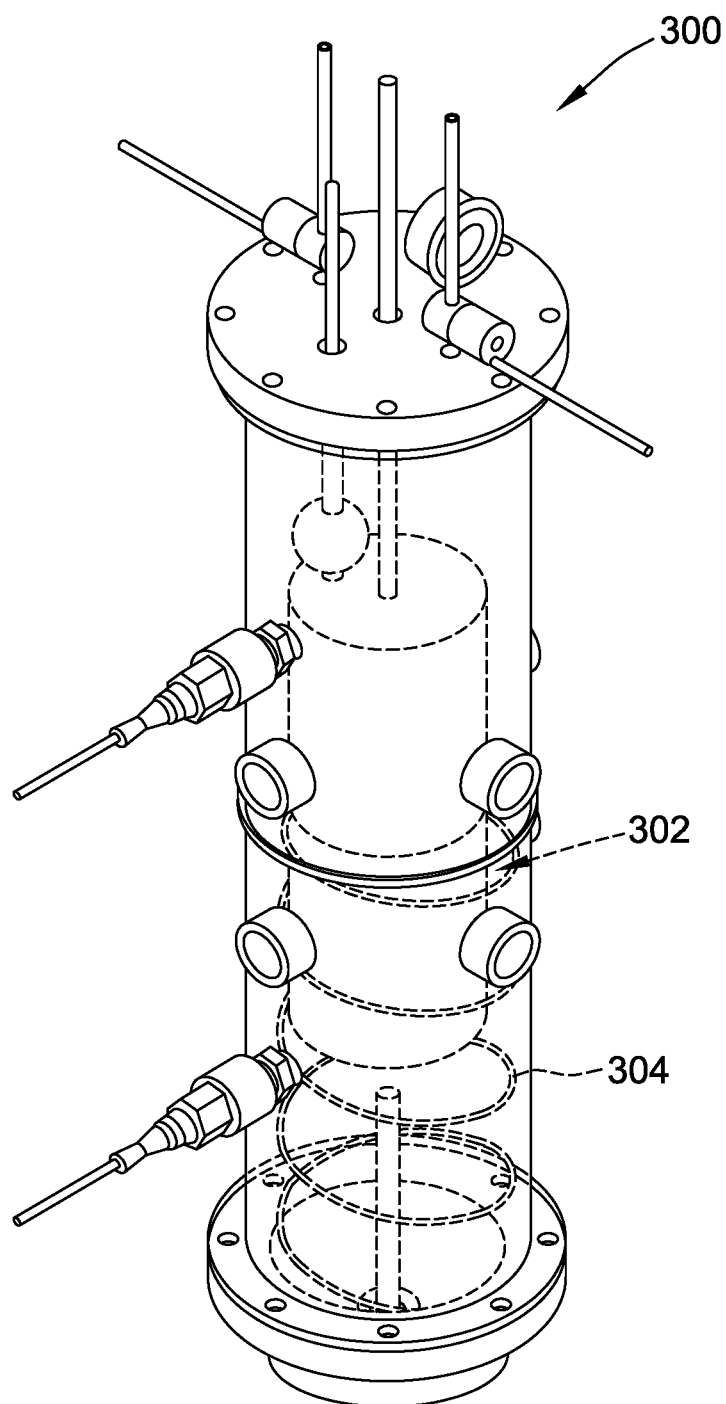
FIG. 14 is a perspective view of another embodiment of a filtering system suitable for use in the fluid application system shown in FIGS. 1 and 3.
Figure 15:
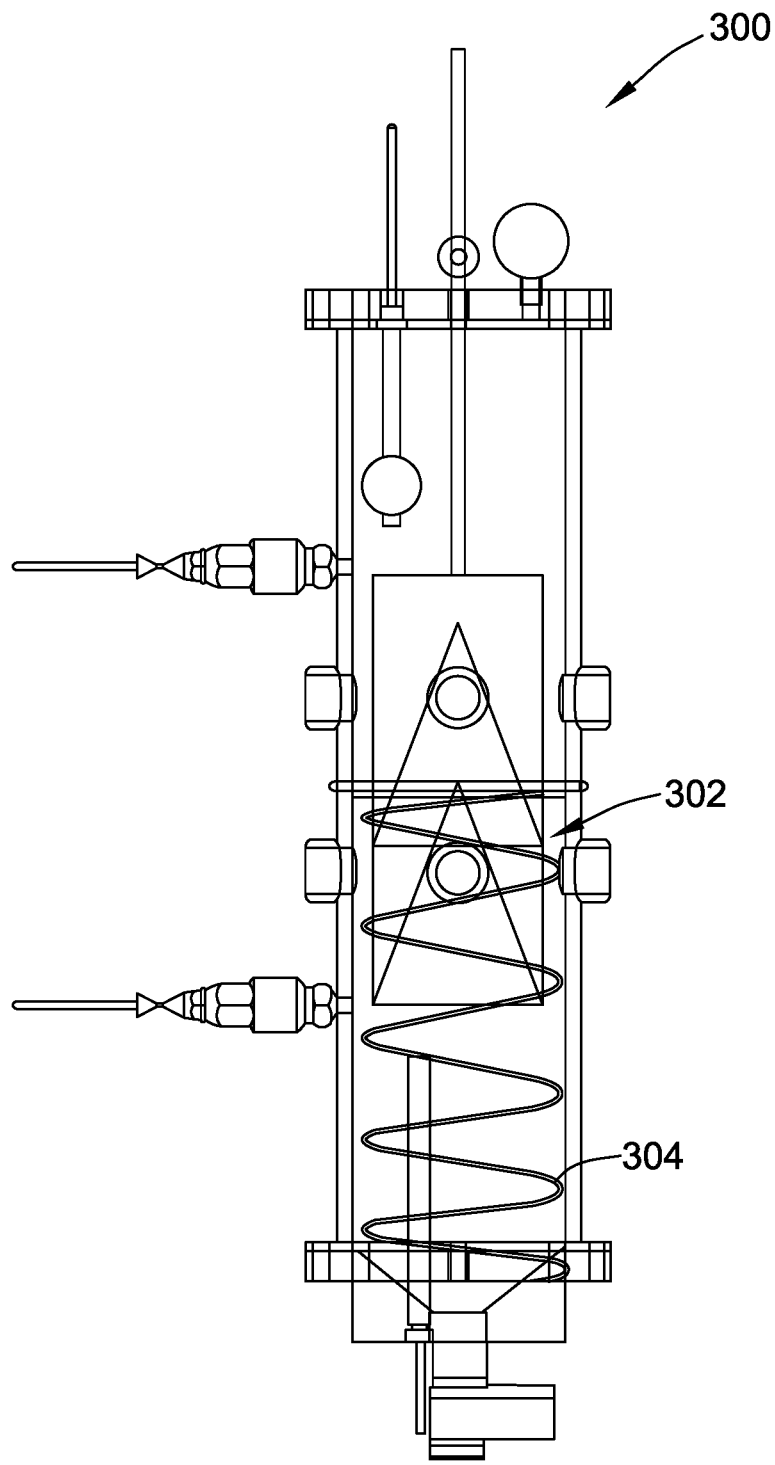
FIG. 15 is a schematic cross-section of the filtering system shown in FIG. 14.
Figure 16:
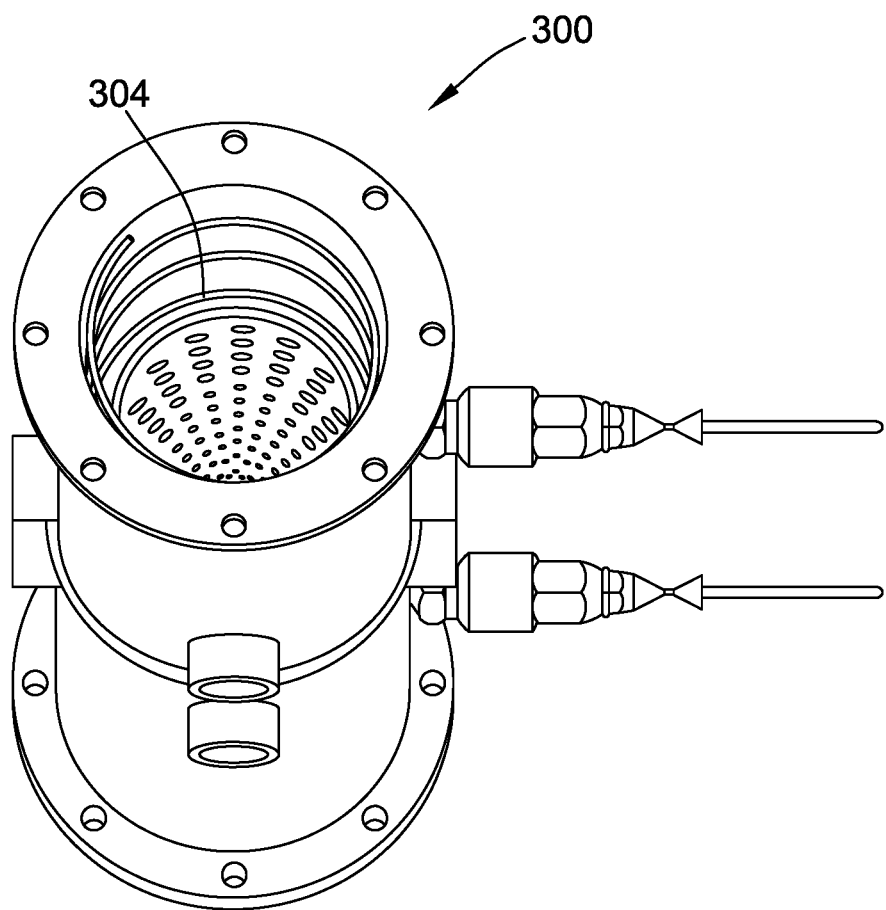
FIG. 16 is a perspective view of a portion of the filtering system shown in FIG. 14.

FIGS. 14-16 illustrate another embodiment of a filtering system indicated generally by the reference number 300. The filtering system 300 is similar to the filtering system 200 except the filtering system 300 includes a different collection system 302. In particular, the collection system 302 includes a filter spring 304 to facilitate operation of the filtering system 300. In the illustrated embodiment, the filter spring 304 is a helical spring that facilitates biasing the collection system 302 in position within the filtering system 300. In other suitable embodiments, the filtering system 300 may include any collection system 302 that enables the fluid application system 100 to function as described herein.

Figure 17:
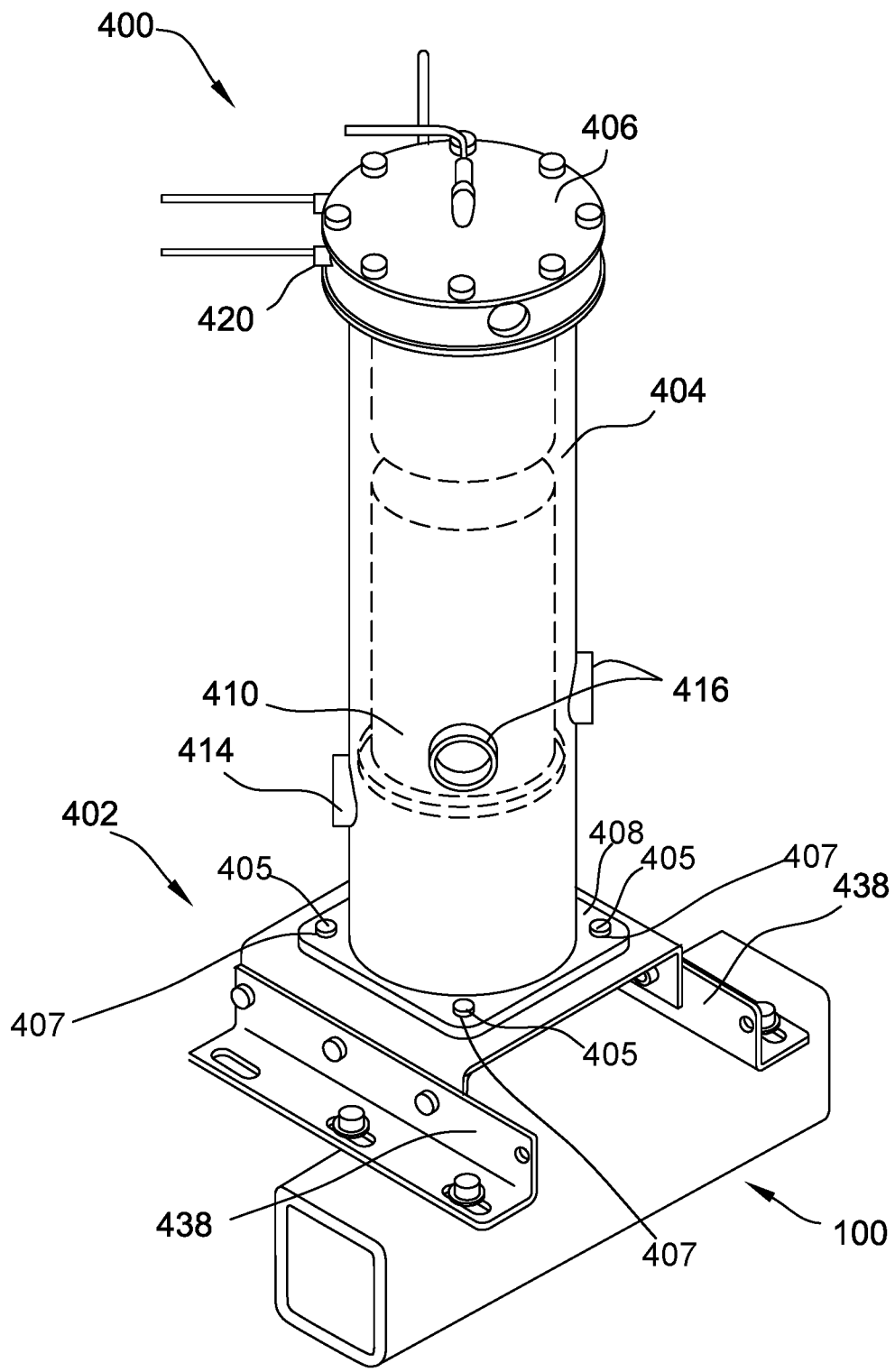
FIG. 17 is a perspective view of another embodiment of a filtering system suitable for use in the fluid application system shown in FIGS. 1 and 3.
Figure 18:
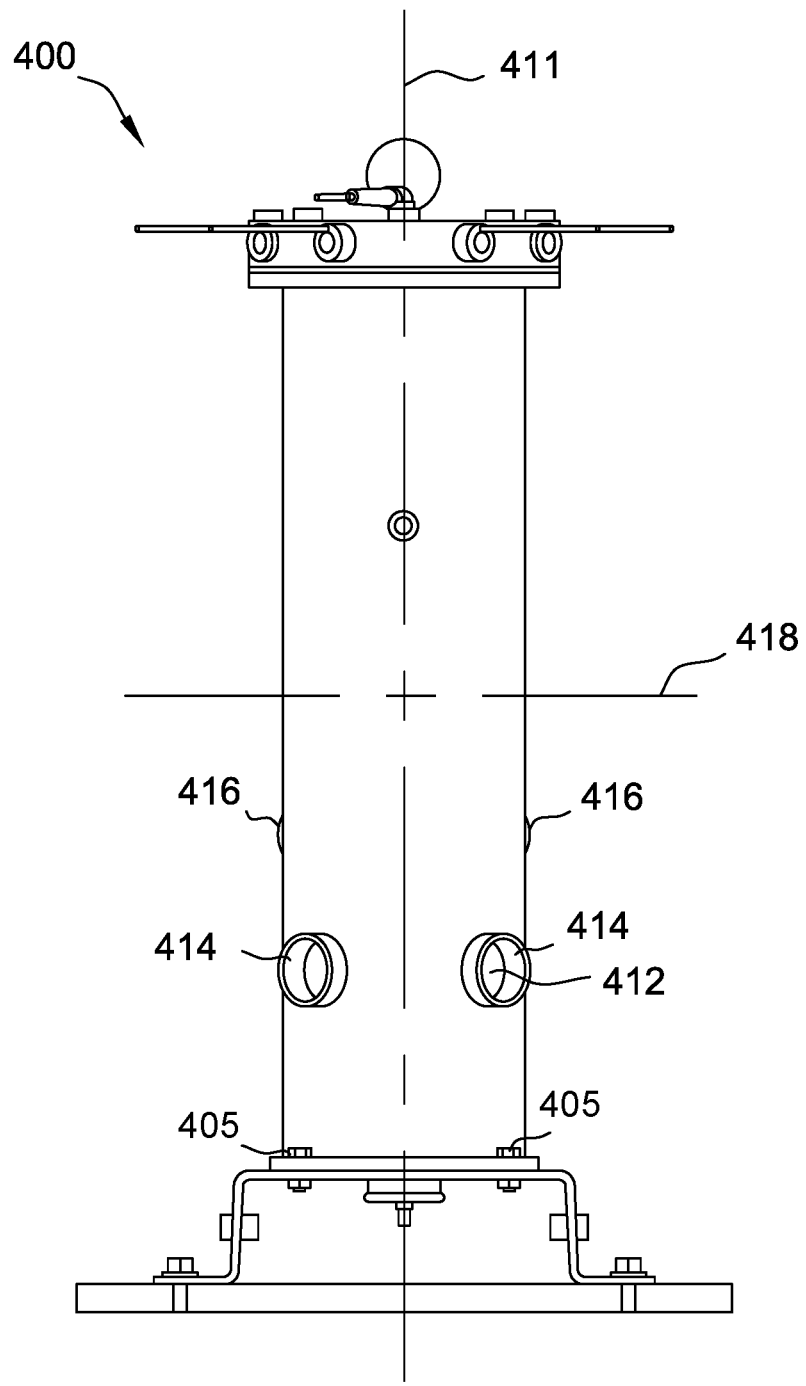
FIG. 18 is a side view of the filtering system shown in FIG. 17.
Figure 19:
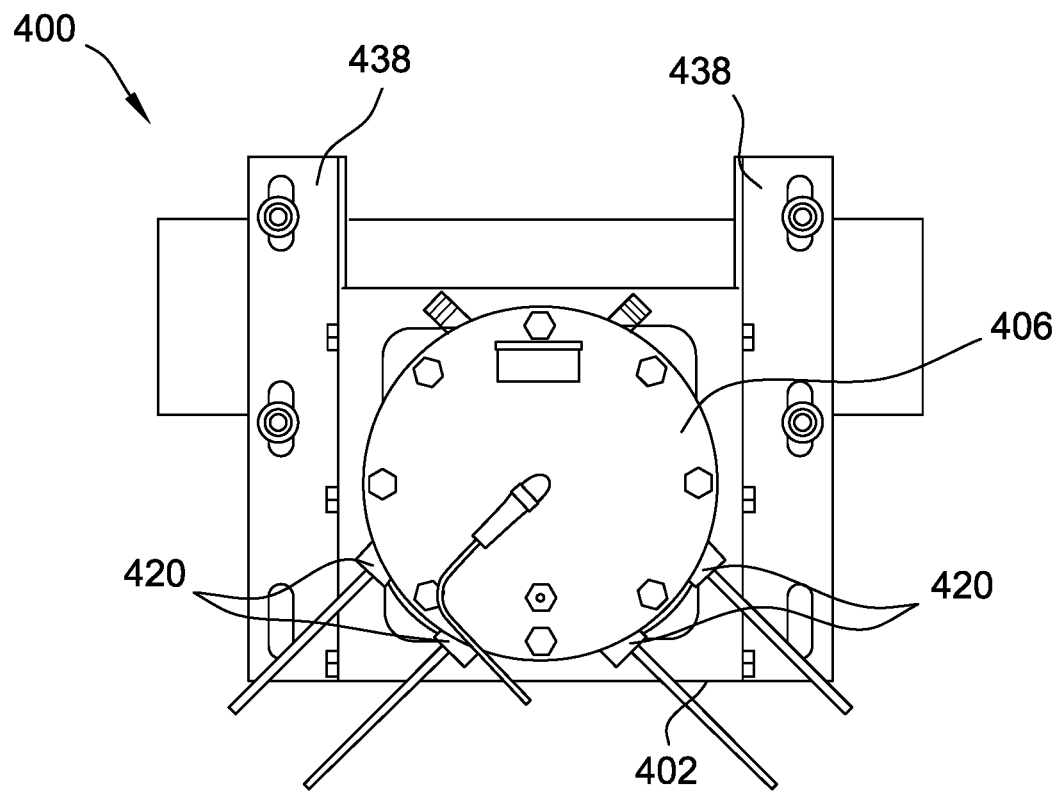
FIG. 19 is a top view of the filtering system shown in FIG. 17.

FIGS. 17-19 illustrate another embodiment of a filtering system indicated generally by the reference number 400. Unless otherwise noted, the filtering system 400 has substantially the same construction and operates in substantially the same manner as the filtering system 200 described above. The filtering system 400 is mounted to a portion of the fluid application system 100 by a mount 402. In suitable embodiments, the filtering system 400 may be coupled to any portion of the fluid application system 100 without departing from some aspects of this disclosure.

The filtering system 400 includes a container 404 with a cap or top wall 406, a bottom wall 408, and a sidewall 410 extending between the top wall 406 and the bottom wall 408. In the illustrated embodiment, the container 404 is a cylinder, and the sidewall 410 extends around a central longitudinal axis 411. The container 404 defines an interior space 412 for holding the fluid. The container 404 is configured to separate the fluid into a liquid and a vapor such that at least a portion of the vapor is disposed above the liquid. In other embodiments, the filtering system 400 may include any container 404 that enables the filtering system 400 to operate as described herein.

In addition, the sidewall 410 defines at least one fluid inlet 414 for fluid to enter the interior space 412, and at least one liquid outlet 416 for liquid to exit the interior space 412. The at least one liquid outlet 416 is disposed above the at least one fluid inlet 414 and below a liquid reference plane 418 defined through the container 404. In other embodiments, the container 404 may include any inlets and/or outlets that enable the filtering system 400 to operate as described herein.

The filtering system 400 also includes a plurality of vapor valves 420 releasably coupled to the top wall 406. Each of the plurality of vapor valves 420 is communicatively coupled to the controller 126 (FIG. 3) for controlling actuation of the vapor valves 420. The controller 126 (FIG. 3) is configured to operate the vapor valves 420 in response to feedback signals received from a liquid level sensor, such as the float sensor 264 (FIG. 5) to regulate the rate and amount of vapor that is released from the filtering system 400. For example, the controller 126 may sequentially activate the vapor valves 420, as described in more detail herein, to increase the rate at which vapor is exhausted from the filtering system 400. Alternatively, the vapor valves 420 may be closed in succession to decrease the release of vapor from the interior space 412. Accordingly, the vapor valves 420 may be used to control the liquid level of fluid within the filtering system 400. In other embodiments, the vapor valves 420 may be controlled in any suitable manner that enables the filtering system 400 to function as described herein. For example, in some embodiments, the vapor valves 420 may be manually controlled.

Figure 20:
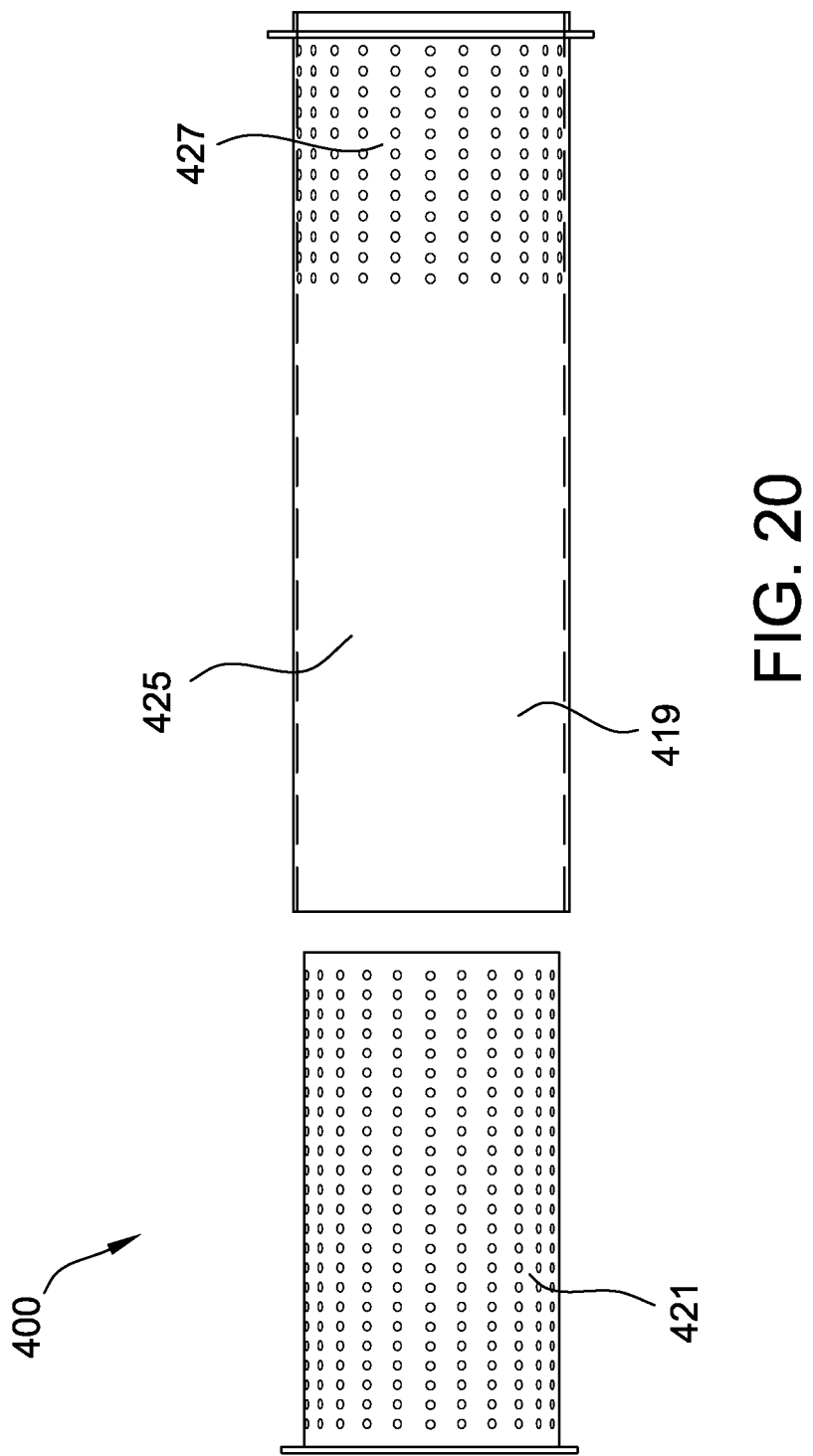
FIG. 20 is an exploded view of a portion of the filtering system shown in FIG. 17.

FIG. 20 is an exploded view of a separator or baffle 419 and a filter screen 421 that are received within the interior space 412 of the container 404. When the filtering system 400 is assembled, the separator 419 is disposed between the filter screen 421 and the sidewall 410 (shown in FIG. 19) of the container 404 (shown in FIG. 19). The separator 419 and the filter screen 421 function in the same manner as the separator 248 and filter screen 244 described above with reference to FIGS. 4-6. For example, the separator 419 facilitates separating fluid within the interior space 412 of the container 404 into liquid and vapor. In the exemplary embodiment, as shown in FIG. 20, the separator 419 includes a wall 425 that is substantially impervious to fluid, and a perforated portion 427 that is at least partially open for fluid to flow through. While in the illustrated embodiment the separator 419 has a cylindrical shape, it is understood that the separator 419 may have any shape that enables the separator 419 to function as described herein. In suitable embodiments, the separator 419 may be made from any material that enables the separator 419 to function as described herein.

Figure 21:
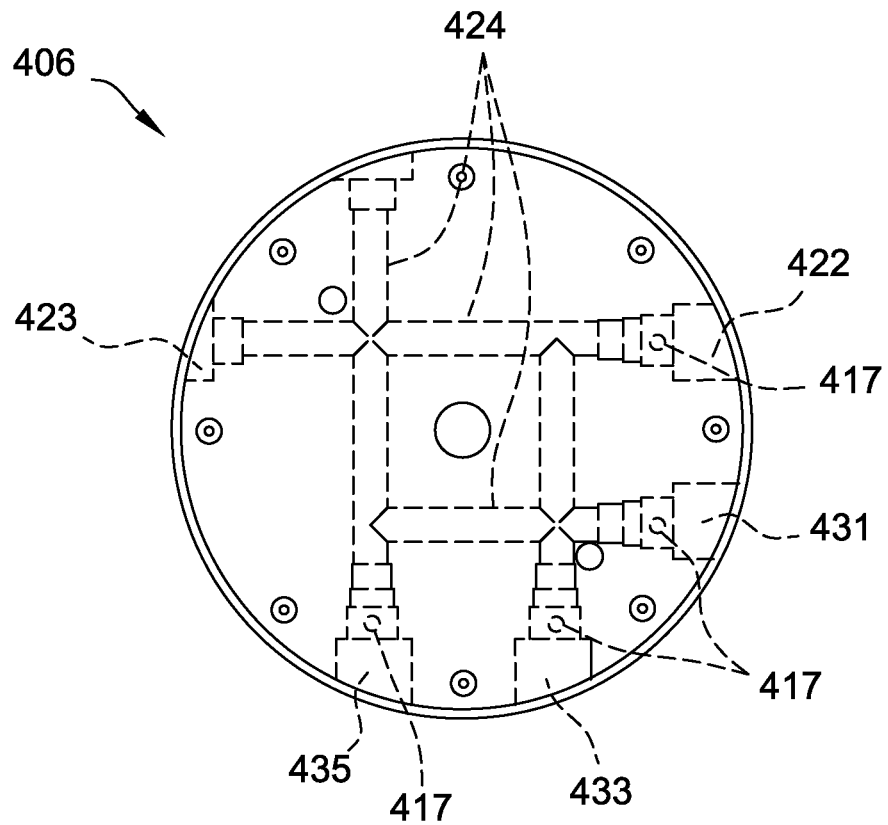
FIG. 21 is a top view of a manifold of the filtering system shown in FIG. 17.
Figure 22:
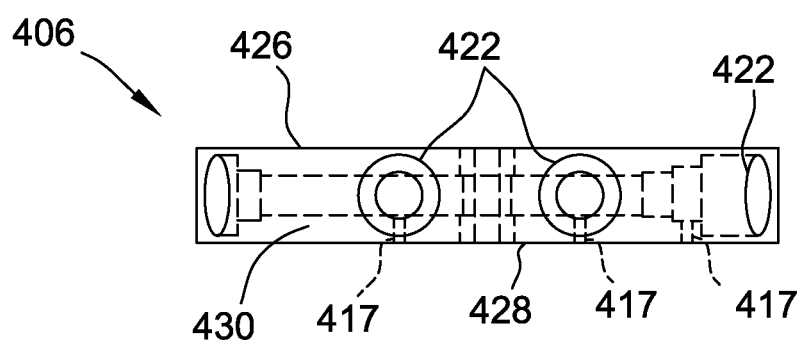
FIG. 22 is a side view of the manifold shown in FIG. 21.

As shown in FIGS. 21 and 22, the top wall 406 is a circular plate. The top wall 406 includes a top surface 426, a bottom surface 428, and a side surface 430. The side surface 430 extends about the axis 411 and between the top surface 426 and the bottom surface 428. In some embodiments, the top wall 406 may have other shapes without departing from some aspects of this disclosure.

In reference to FIGS. 17 and 21, in the illustrated embodiment, the top wall 406 forms an upper end of the container 404 and at least partially encloses the interior space 412. For example, the top wall 406 may be releasably coupled to the sidewall 410. In addition, in the illustrated embodiment, the top wall 406 is configured to act as a manifold and facilitate the release of vapor from the interior space 412 of the container 404, and thus may also be referred to as a "cap manifold". In particular, the top wall 406 includes a plurality of valve recesses 422, each configured to receive one of the plurality of vapor valves 420. Each recess 422 is defined in the side surface 430 of the top wall 406, and extends into the top wall 406 from the side surface 430. In the exemplary embodiment, the recesses 422 are threaded, and threadably engage threads 429 (shown in FIG. 24) of the vapor valves 420 to releasably couple the vapor valves 420 to the top wall 406.

Figure 23:
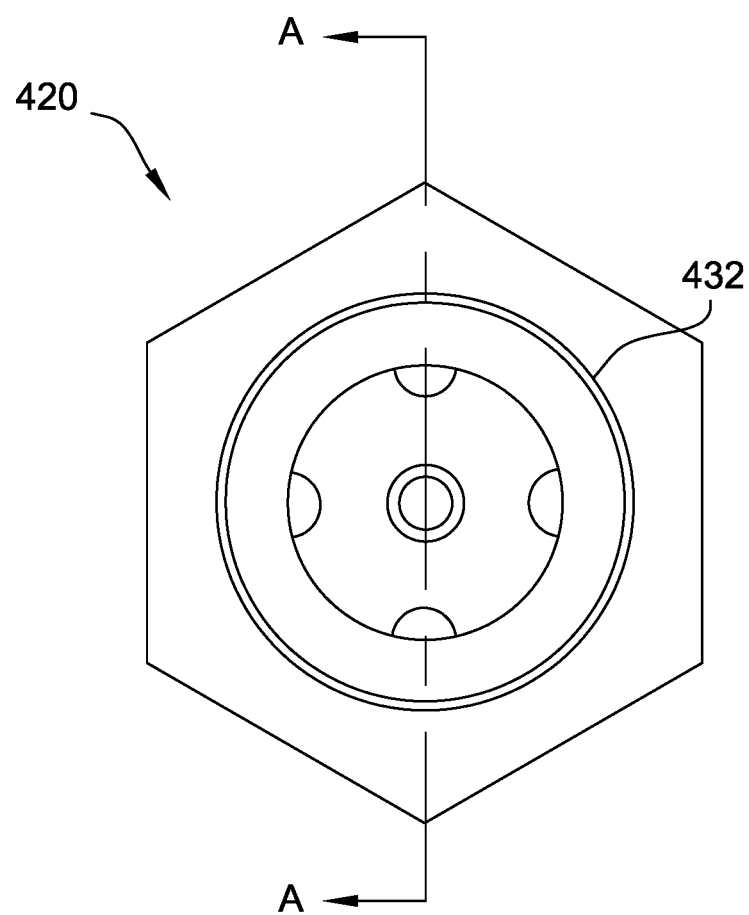
FIG. 23 is an end view of a valve for use with the manifold shown in FIG. 21.
Figure 24:
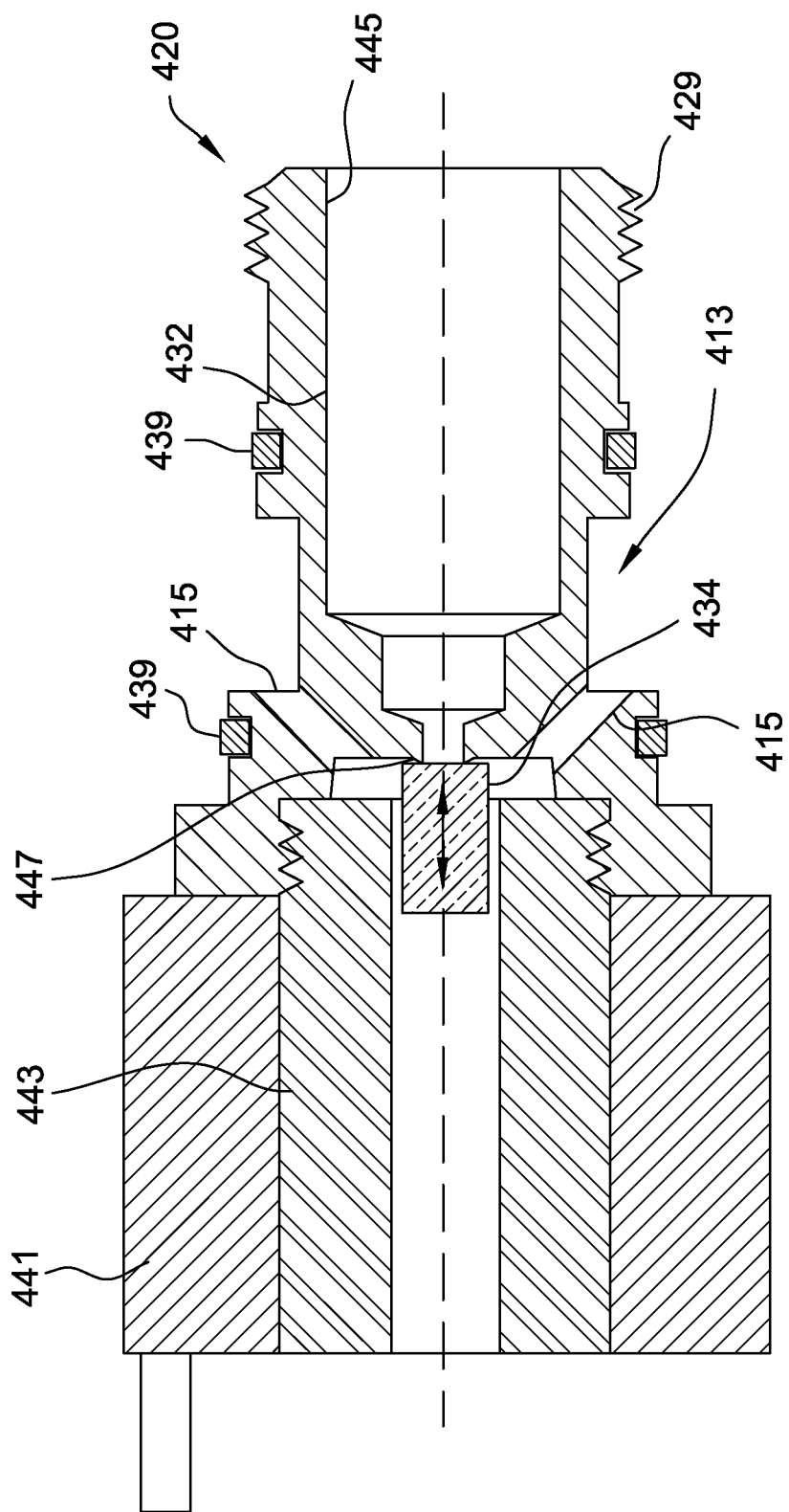
FIG. 24 is a sectional view of the valve shown in FIG. 22 taken along section line A-A.

As shown in FIGS. 23 and 24, each vapor valve 420 includes a valve body 432, a solenoid coil 441, a valve guide 443, and a poppet 434. The valve body 432 defines a plurality of inlet channels 415 that permit fluid flow towards an outlet end 445 of the valve body 432 when the vapor valve 420 is in an opened or intermediate position. In the illustrated embodiment, each vapor valve 420 includes four inlet channels 415, although other embodiments may include any suitable number of inlet channels that enable the filtering system 400 to function as described herein.

The poppet 434 is displaceable relative to the valve body 432 to actuate the vapor valve 420 between an open position, a closed position, and/or intermediate positions. In particular, the poppet 434 rests against a valve seat 447 in the closed position, and is spaced from the valve seat 447 in the open position and intermediate positions. In some embodiments, the vapor valves 420 are modular and are interchangeable with other vapor valves 420. Accordingly, the vapor valves 420 may be replaced to adjust operating parameters of the manifold without replacing the top wall 406.

When the vapor valves 420 are positioned in respective recesses 422, an inlet cavity 413 (FIG. 24) is defined between the vapor valve 420 and the top wall 406. The inlet channels 415 of the vapor valve 420 are in fluid communication with a respective inlet 417 defined in the top wall 406 via the inlet cavity 413. The inlet cavity 413 is sealed by seals 439 (e.g., elastomeric O-rings) of the vapor valve 420 that sealingly engage the top wall 406. The inlet cavity 413 has an annular shape, and permits fluid flow from the respective inlet 417 to each of the inlet channels 415 of the respective vapor valve 420. In other embodiments, the top wall 406 may include any recess that enables the filtering system 400 to operate as described herein.

In addition, the top wall 406 includes passageways 424 to connect the recesses 422 to outlets 423. The vapor valves 420 are configured to regulate fluid flow through the passageways 424, and exhaust vapor from the container 404. In the illustrated embodiment, the passageways 424 extend linearly and are in fluid communication with each other such that the vapor valves 420 are fluidly connected in parallel by the passageways 424. The passageways 424 are located between the top surface 426 and the bottom surface 428 of the top wall 406. In other embodiments, the passageways 424 may have any configuration that enables the filtering system 400 to operate as described herein.

In the exemplary embodiment, each vapor valve 420 is a solenoid valve operable in a pulse-width-modulated mode and a static mode. The controller 126 (shown in FIG. 3) is communicatively coupled to the vapor valves 420, and is configured to individually control the vapor valves 420. In addition, the controller 126 is configured to individually actuate each vapor valve 420 in the pulse-width-modulated mode and the static mode. Accordingly, the controller 126 regulates vapor release through the vapor valves 420.

In the static mode, the controller 126 (shown in FIG. 3) outputs a signal to the vapor valve 420 to move the poppet 434 of the vapor valve 420 to a desired position (e.g., the open position, the closed position, or the intermediate position), and maintains the poppet 434 of the vapor valve 420 at the desired position until further actuated by the controller 126. For example, to maintain the poppet 434 in an opened position, the controller 126 may output a constant or continuous signal (e.g., current) to the vapor valve 420 to keep a solenoid coil 437 continuously energized. In other words, the vapor valves 420 are not continuously pulsed in the static mode. In the pulse-width-modulated mode, the vapor valves 420 are continuously actuated or pulsed according to a duty cycle and frequency based on output signals from the controller 126. The vapor valves 420 may be pulsed at any suitable frequency that enables the filtering system 400 to function as described herein, including, for example and without limitation, from about 1 hertz (Hz) to about 30 Hz, from about 5 Hz to about 20 Hz, or about 10 Hz. In the illustrated embodiment, the filtering system 400 includes four vapor valves 420. In other suitable embodiments, the filtering system 400 may include any number of vapor valves 420 that enables the filtering system 400 to operate as described herein.

In reference to FIGS. 17 and 21, during operation, vapor in the upper portion of the interior space 412 is allowed to exit the container 404 when at least one of the vapor valves 420 is an open position or intermediate position. In particular, when at least one of the vapor valves 420 is in the open position or intermediate position, vapor flows into one of the inlets 417 corresponding to the open vapor valve 420, and through the passageways 424 from the inlet 417 to the outlets 423. The fluid application system 100 (shown in FIG. 1) may include fluid conduits or lines connecting the outlets 423 to the dispensing tubes 140 (shown in FIG. 2) such that vapor released by the filtering system 400 is directed toward and/or into the ground through the dispensing tubes 140 connected to or positioned behind the soil preparation mechanism 142 (shown in FIG. 2). In the illustrated embodiment, the top wall 406 includes two outlets 423. In other embodiments, the top wall 406 may include any suitable number of outlets 423 that enable the filtering system 400 to operate as described herein.

In reference to FIGS. 3, 17, and 21, during operation, the controller 126 is configured to individually actuate each of the vapor valves 420 in the pulse-width-modulated mode and the static mode. For example, the controller 126 is configured to send signals to a first vapor valve 431 to cause the first vapor valve to operate in the pulse-width-modulated mode, while a second vapor valve 433 and third vapor valve 435 operate in the static mode.

For example, during operation, the controller 126 (shown in FIG. 3) may operate the first vapor valve 431 in the pulse-width-modulated mode and operate the remaining vapor valves 420 in the static mode. Accordingly, the controller 126 may initially actuate the first vapor valve 420 while the remaining vapor valves 420 remain closed. To adjust the rate of vapor release, the controller 126 may change the duty cycle of the first vapor valve 431 operating in the pulse-width-modulated mode. When the first vapor valve 431 reaches its maximum duty cycle, the controller 126 may actuate the second vapor valve 433 in a static mode. The controller 126 may then reset the duty cycle of the first vapor valve 431. To further adjust the rate of vapor release, the controller 126 may adjust the duty cycle of the first vapor valve 431 operating in the pulse-width-modulated mode while the second vapor valve 433 operates in the static mode. The controller 126 may actuate the third vapor valve 435 and fourth vapor valve 420 in the static mode to further adjust the rate of vapor release. To decrease the rate of vapor release, the controller 126 may decrease the duty cycle of the first vapor valve 431 and/or close the vapor valves 420 operating in the static mode.

The controller 126 may receive feedback from a liquid level sensor, such as the float sensor 264 (FIG. 5) and adjust the rate of vapor release to correspond to a determined rate of change of the liquid level. For example, the controller 126 may actuate the first vapor valve 431 at a duty cycle while the vapor valves 420 operating in the static mode remain in a closed position. As the rate of change of the liquid level changes, the controller 126 may adjust the duty cycle of the first vapor valve 431 to match the rate of change of the liquid level. If the first vapor valve 431 reaches a maximum duty cycle and/or the rate of change of the liquid level is above a threshold level, the controller 126 may actuate one or more of the vapor valves 420 operating in the static mode to increase the rate of vapor release. If the rate of change of the liquid level decreases, the controller 126 may adjust the duty cycle of the first vapor valve 431 and/or actuate one or more of the vapor valves 420 operating in the static mode to decrease the rate of vapor release.

As a result, the filtering system 400 allows the vapor valves 420 to have increased resolution across a greater range of flow rates in comparison to systems including a plurality of pulsed vapor valves. Specifically, the filtering system 400 allows the vapor valves 420 to have the maximum resolution of a single vapor valve and the release rate of a plurality of the vapor valves 420 by utilizing individual control of the vapor valves 420 and allowing some vapor valves to operate in a static mode while one of the vapor valves operates in the pulse-width-modulated mode. In other suitable embodiments, the vapor valves 420 may operate in any suitable manner without departing from some aspects of the disclosure.

Referring again to FIG. 17, the container 404 is mounted to the fluid application system 100 (e.g., to a toolbar of the fluid application system 100) by the mount 402. In particular, the bottom wall 408 of the container 404 is fastened to the mount 402 by a plurality of fasteners 405. In this embodiment, the bottom wall 408 includes four fastener openings 407 that each receive one of the fasteners 405 to secure the container 404 to the mount 402.

Figure 25:
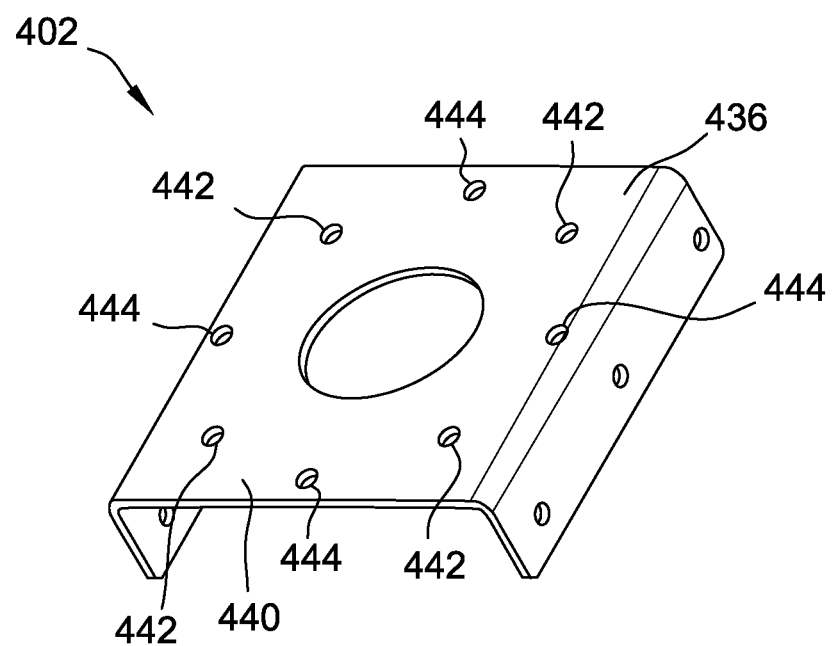
FIG. 25 is a perspective view of a portion of a mount for the filtering system shown in FIG. 17.
Figure 26:
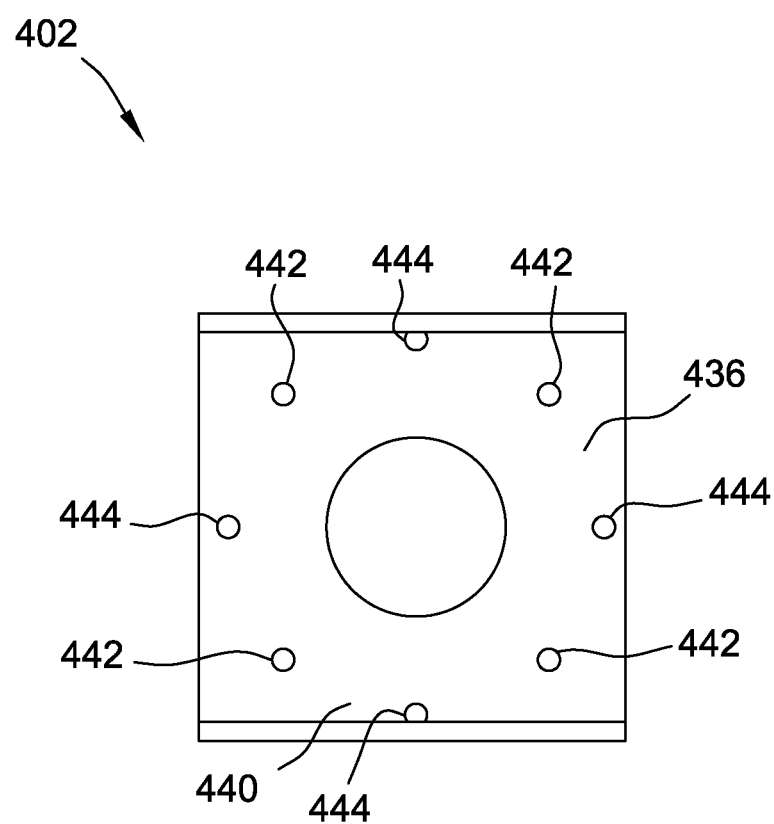
FIG. 26 is a top view of the mount shown in FIG. 25.

In reference to FIGS. 25 and 26, the mount 402 includes a C-shaped bracket 436 and rails 438 attached to opposite sides of the bracket 436. The bracket 436 includes a mounting surface 440 defining a set of first openings 442 and a set of second openings 444. Each of the first and second sets of openings 442 and 444 include a number of openings that corresponds to the number of fastener openings 407 in bottom wall 408 of the container 404. The first openings 442 are configured to receive the fasteners 405 for securing the container 404 (shown in FIG. 17) to the mount 402 in a first orientation. The second openings 444 are configured to receive the fasteners 405 for securing the container 404 to the mount 402 in a second orientation. The first openings 442 and the second openings 444 are arranged on the mount surface 440 such that the resulting first and second orientations of the container 404 are offset from one another, thereby providing flexibility in how the container 404 is mounted to a toolbar of the fluid application system 100.

In this embodiment, the first openings 442 and the second openings 444 are arranged in an annular ring, and are spaced equal angular distances about a center of the mount surface 440 in an alternating pattern. In particular, each of the second openings 444 is positioned approximately midway between two adjacent first openings 442, and each of the first openings 442 is positioned approximately midway between two adjacent second openings 444. In this embodiment, each first opening 442 is spaced an angular distance from each adjacent second opening 444 by about 45° such that the different orientations of the container 404 are offset by approximately 45°. In this embodiment, the mount 402 includes four first openings 442 and four second openings 444, corresponding to the number of fastener openings 407 in the bottom wall 408. In other embodiments, the mount 402 may include any suitable number of openings that enable the filtering system 400 to operate as described herein.

The container 404 (shown in FIG. 17) may be aligned in different orientations by rotating, i.e., indexing, the container 404 relative to the mount 402 such that the fastener openings 407 in the bottom wall 408 of the container 404 align with one of the first set of openings 442 and the second set of openings 444. The openings 442, 444 are spaced such that the container 404 may be indexed in 45° increments. In this embodiment, the container 404 may be secured to the mount 402 in eight different orientations. In other embodiments, the container 404 may have any position that enables the filtering system 400 to operate as described herein.

Referring back to FIG. 17, in the exemplary embodiment, the first orientation of the container 404 allows fluid lines to connect to the fluid inlets 414 and the liquid outlets 416 in a first configuration. The second orientation of the container 404 allows fluid lines to connect to the fluid inlets 414 and the liquid outlets 416 in a second configuration. Accordingly, the first orientation and the second orientation facilitate the container 404 coupling to different fluid lines and/or fluid lines of different apparatus. In addition, the different orientations of the container 404 may facilitate the container 404 attaching to and being removed from the fluid application system 100. In some embodiments, individual components of the container 404 may be adjustable relative to the mount 402. For example, in some embodiments, the top wall 406 and/or the sidewall 410 may be secured in different orientations relative to the mount 402.

The methods, apparatus, and systems described herein facilitate handling fluid for application to ground. In one suitable embodiment, a filtering system for collecting material suspended in a volatile fluid is described. The system includes a container defining an interior space for holding the fluid and a separator disposed in the interior space. The separator is configured to separate the fluid into a liquid and a vapor such that the vapor is disposed above the liquid. A liquid level is defined between the liquid and the vapor. The filtering system further includes an inlet for the fluid to enter the interior space and an outlet for the fluid to flow out of the interior space. The fluid flows from the inlet towards the outlet. The container is configured such that the liquid level is disposed above the outlet. A collection mechanism is disposed within the container and at least partially between the outlet and the inlet for collecting the material suspended in the fluid and releasing the material at selected times.

In one suitable embodiment, the filtering system is connected in fluid communication with a valve configured to control the supply of fluid through the filtering system. The collection mechanism releases the material when the valve is in a closed position to inhibit fluid flow through the interior space.

In another suitable embodiment, the collection mechanism includes a magnet magnetized to collect material.

In yet another suitable embodiment, the collection mechanism includes an electromagnet and a power source providing electrical current to the electromagnet.

Moreover, in another suitable embodiment, the filtering system is used in combination with a vehicle that travels along application paths. The collection mechanism is configured to release the material when the vehicle reaches the end of one of the application paths.

In another suitable embodiment, the collection mechanism further includes a secondary collection apparatus for holding the material released by the collection mechanism.

In another suitable embodiment, a sensor is configured to detect when the collection mechanism has collected a specified amount of material. The specified amount of material is based at least in part on the maximum collection capacity of the collection mechanism. In one embodiment, an operator interface indicates to an operator when the collection mechanism collects the specified amount of material.

In addition, in another suitable embodiment, a sensor is configured to detect the amount of current through the electromagnet and a controller is connected to the sensor. The controller is configured to determine based on the current and voltage when the collection mechanism has collected the specified amount of material. In one embodiment, upon determining the collection mechanism has collected the specified amount of material the controller performs at least one function of the following functions: indicating to an operator the collection mechanism has reached maximum capacity, activating a cycle of the collection mechanism to release at least a portion of the collected material, and powering off a power source connected to the controller.

In some suitable embodiments, the fluid is a volatile liquid agricultural fertilizer. In one embodiment, the filtering system is used in combination with a pressurized tank for storing the fertilizer and a plurality of dispensing tubes for dispensing the fertilizer on the field. The filtering system is coupled between and in fluid connection with the pressurized tank and the dispensing tubes.

In one particularly suitable embodiment, a method for filtering volatile fluid using a filtering system is provided. The filtering system includes a container defining an interior space and a collection mechanism disposed in the interior space. The container includes an outlet. The method includes separating the fluid into a liquid and a vapor, directing the fluid through the interior space such that the fluid flows towards the outlet, and discharging the fluid through the outlet. The material is collected with the collection mechanism as the fluid flows through the container. The method further includes selectively inhibiting fluid flow through the interior space and releasing material from the collection mechanism when fluid flow through the interior space is inhibited. The released material is stored such that the material is inhibited from being carried through the outlet when fluid flow through the interior space resumes.

In another suitable embodiment of the method set forth above, the collection mechanism includes an electromagnet and the method further includes drawing current through the electromagnet to attract material to the electromagnet.

In yet another suitable embodiment of the method described above, a valve is closed to inhibit fluid flow.

In yet another suitable embodiment of the method described above, the released material is stored in a compartment connected to the container. In one embodiment, the compartment is detached from the container to remove material from the compartment.

In another suitable embodiment, the method includes sensing a characteristic of the filtering system and sending information relating to the characteristic to a controller connected to the filtering system. In one embodiment, a signal is sent from the controller to the collection mechanism. The signal causes the collection mechanism to release material.

In still another embodiment, a system for dispensing a volatile fluid includes a container defining an interior space for holding the fluid. The container is configured to separate the fluid into a liquid and a vapor such that at least a portion of the vapor is disposed above the liquid. At least one outlet is defined in the container and disposed below a liquid plane defined through the container. At least one vapor valve is connected to the container and configured to exhaust the portion of the vapor disposed above the liquid from the container. A sensor is configured to detect the level of the liquid in the container. The system further includes a controller communicatively coupled to the sensor and the vapor valve. The controller is configured to determine if the level of the liquid is below the liquid plane and control actuation of the vapor valve to maintain the level of the liquid at or above the at least one outlet.

In another suitable embodiment of the system described above, the controller is configured to perform a function upon determining that the level of the liquid is below the at least one outlet. The function includes at least one of triggering an indicating alarm, stopping fluid flow out of the container, and causing liquid to bypass the at least one outlet.

In still another suitable embodiment, the system further includes a plurality of inlets for fluid to enter the container. The plurality of inlets are positioned below the at least one outlet.

In yet another suitable embodiment, the system further includes an injection port for injection of additives into the container. The injection port is configured such that additives injected through the injection port are substantially uniformly distributed throughout the interior space.

Moreover, in another suitable embodiment, a metering component is connected in fluid communication with and downstream from the at least one outlet. In one embodiment, the metering component includes at least one pulse-width-modulated solenoid valve.

In another particularly suitable embodiment, a method for dispensing a fluid from a container defining an interior space for holding the fluid is provided. The fluid includes a liquid and vapor. The container includes an upper portion and a lower portion. The method includes generating a flow of fluid through the container such that the vapor and liquid are separated. The vapor is disposed above the liquid. The liquid is dispensed through at least one outlet defined in the container. The at least one outlet is disposed below a liquid plane defined through the container intermediate the upper portion and the lower portion. The method further includes determining the level of the liquid in the interior space, determining if the level of the liquid is below the liquid plane, and releasing vapor from at least one vapor valve such that the liquid level is maintained above the liquid plane.

In another suitable embodiment, the method described above further includes sensing a characteristic of the fluid in the container and sending information relating to the characteristic to a controller. In one embodiment, the controller determines the level of the liquid in the interior space. In another embodiment, the method further comprises sending a signal from the controller to the at least one vapor valve based on the sensed characteristic. In another embodiment, the characteristic relates to the vapor flowing through the at least one vapor valve. In still another embodiment, the method further includes sending a signal from the controller to the at least one vapor valve. The signal causes the at least one vapor valve to adjust the flow of vapor through the at least one vapor valve.

In another particularly suitable embodiment, a method for handling a volatile fluid includes separating the fluid into a liquid and a vapor within a container such that a liquid level is defined between the liquid and the vapor. The level of the liquid in relation to the container is sensed. At least one valve is actuated to exhaust the vapor from the container to maintain the level of the liquid at a desired level. The at least one valve is in communication with a controller. The method further includes sending a signal from the at least one valve to the controller, and determining a characteristic of the fluid based at least in part on the signal.

In another suitable embodiment, the method described above further includes sending signals from the controller to an operator interface and displaying the characteristic on the operator interface. In one embodiment, at least one of an alarm, a shutoff, and a bypass is triggered when the characteristic is within a predetermined range of values.

In still another suitable embodiment, the method includes positioning the at least one valve in a closed position to inhibit the vapor from being released in coordination with the cycling of a fluid application system connected to the container.

In still another particularly suitable embodiment, a system for handling a volatile fluid includes a container for storing and separating the fluid into a liquid and a vapor such that a liquid level is defined substantially between the liquid and the vapor. The system includes at least one valve for releasing the vapor from the container, at least one sensor for sensing the liquid level, and a controller in communication with the at least one valve and the at least one sensor. The controller is configured to control the at least one valve to release the vapor such that the liquid level is maintained at or above a desired liquid level. The controller is configured to determine diagnostic data based at least in part on signals received from the least one valve and the at least one sensor.

In another suitable embodiment of the above described system, a global positioning device is communicatively coupled to the controller to determine one or more positions of the system. The controller is configured to generate a spatial map of the diagnostic data based on the one or more determined positions of the system.

In one suitable embodiment, the at least one sensor comprises a float.

In another suitable embodiment, the at least one sensor comprises a capacitive device.

In still another suitable embodiment of the system described above, the at least one sensor comprises a plurality of liquid presence sensors. At least one liquid presence sensor of the plurality of liquid presence sensors is positioned above the liquid level and at least one other liquid presence sensor of the plurality of liquid presence sensors is placed below the liquid levels.

In yet another suitable embodiment, the system further includes at least one of a pressure sensor, a temperature sensor, a density sensor, a valve position sensor, a valve voltage sensor, a valve current sensor, a valve duty cycle sensor, a valve orifice measurement device, a flow sensor, and a flow switch.

Moreover, in another suitable embodiment, the controller determines the diagnostic data based at least in part on one of a pressure, a temperature, a density, a position of the at least one valve, saturation curves, and enthalpy charts.

In some suitable embodiments, the diagnostic data includes the amount of vapor released through the at least one valve. In one embodiment, the system further includes an operator interface communicatively coupled to the controller. The operator interface is configured to display an operational status in response to signals received from the controller. The operational status is based at least in part on the amount of vapor released through the at least one valve.

In one suitable embodiment, a method of removing solid material from a volatile fluid in an interior space defined by a container is described. The container includes an inlet and an outlet. The solid material has a greater density than a density of the fluid. The method includes directing the fluid into the interior space through the inlet and generating a flow of fluid through the interior space at a velocity such that the fluid at least partially separates into vapor and liquid and such that the solid material settles at least partially below the liquid. A portion of the vapor is released through a vapor valve and a portion of the liquid is discharged.

In another suitable embodiment, the method further includes collecting at least a portion of the solid material in a bottom of the container.

In yet another suitable embodiment, a flow of the fluid is generated through the interior space at a velocity which is less than at least one of a percolation speed of the vapor and a downward velocity of the solid material due to gravitational forces.

In another suitable, the method further includes reducing the velocity of the fluid flow to facilitate the solid material settling below the liquid.

In one suitable embodiment, a system for removing solid material from a volatile fluid includes a container defining an interior space for holding the fluid, a separator disposed within the interior space and configured to separate the fluid into vapor and liquid, an inlet port for fluid to enter the interior space, and an outlet port for liquid to exit the interior space. The separator is configured to control a velocity of the fluid flowing between the inlet port and the outlet port such that the vapor is separated from and at least partially disposed above the liquid and the solid material is separated from and disposed at least partially below the liquid. The outlet port is configured to discharge the liquid.

In another suitable embodiment, a baffle is adjacent the outlet port to inhibit vapor flowing through the outlet port.

In yet another suitable embodiment, the container includes an upper portion, a lower portion, and a middle portion between the upper portion and the lower portion. The inlet port and the outlet port are disposed in the middle portion. The vapor is positioned substantially within the upper portion and the solid material is positioned substantially within the lower portion. In one embodiment, at least one of the upper portion and the lower portion is positionable in relation to the middle portion. A coupling mechanism is disposed on at least one of the upper portion, the middle portion, and the lower portion to connect the middle portion to the at least one of the upper portion and the lower portion. In another embodiment, a drain is disposed in the lower portion of the container.

In another embodiment, the fluid is a volatile nutrient-rich fluid for use as an agricultural fertilizer. The system further including at least one safety device configured for the safe and effective handling of the fluid. In one embodiment, the at least one safety device includes at least one of the following: a vent valve, a hydrostatic relief valve, a pressure gauge, an overflow protection device, and a hose breakaway device.

In still another suitable embodiment, a system for removal of material from a volatile fluid includes a container defining an interior space for containing the fluid. The container is configured such that the fluid separates into liquid and vapor. A casing is adjacent the container and configured to collect the material removed from the fluid. The casing defines a cavity in fluid communication with the interior space. A seal separates the cavity and the interior space. The seal is positionable between an opened position where the fluid carrying the material is allowed to flow from the interior space to the cavity and a closed position where the fluid is inhibited from flowing from the interior space to the cavity. The casing is configured to facilitate removal of the material while the seal is in the closed position.

In another suitable embodiment of the system described above, the seal is configured to cycle between the closed position and the opened position and the casing is configured to release material from the cavity to the surrounding environment when the seal cycles to the closed position.

In yet another suitable embodiment of the system described above, the seal comprises a first seal and the system further includes a second seal and a collector removably connected to the casing for collecting material from the cavity. The second seal is disposed between the collector and the casing and positionable between an opened position and a closed position.

In still another embodiment, the system further includes a discharge port for discharging material from the cavity to the surrounding environment. The material is discharged at least in part due to the force of gravity.

Moreover, in another embodiment, the system further includes an output device configured to output at least one of a visually- and audibly-perceptible alarm to indicate when material and volatile fluid are being released from the cavity.

In another embodiment, the system further includes a manually controlled actuator configured to discharge material from the cavity when actuated.

In another suitable embodiment of the system described above, the casing includes a valve that cycles between opened and closed positions.

In another suitable embodiment, the system further includes a controller configured to send signals to the casing that cause the casing to release material from the cavity. In one embodiment, the controller is configured to control the casing such that the casing releases material in coordination with an application cycle of a distribution manifold connected to the reservoir.

In still another embodiment, the system further includes a vent for releasing vapor. The vent is configured to release vapor to one of a ground engagement device and the atmosphere. In one embodiment, the system further includes a valve to control release of vapor from the vent during predetermined time periods.

In another particularly suitable embodiment, a method of removing material from a volatile fluid using a filtering system is provided. The filtering system includes a container defining an interior space and a filter media disposed within the interior space. The container has an upper portion and a lower portion. The method includes generating fluid flow from the lower portion in a direction at least partially towards the upper portion. The flow of the fluid is sufficient to carry the material at least partially in a direction towards the upper portion. The material is forced against the filter media such that the filter media at least partially holds the material while fluid flows through the filter media. A velocity of the fluid flow is reduced such that at least some of the material is released from the filter media. The released material is directed towards the lower portion of the container and collected in the lower portion of the container.

In another suitable embodiment, the method further includes cycling the velocity of the fluid flow between a velocity sufficient to hold the material against the filter and a reduced velocity.

In yet another suitable embodiment of the method described above, the fluid flow is stopped.

In still another suitable embodiment, the method further includes injecting additives into the fluid after material has been removed from the fluid.

In another suitable embodiment, the method further includes directing materials to desired positions on the filter media to facilitate the material releasing from the filter media when the flow is reduced.

In another suitable embodiment of the method described above, the material is directed to a center of the filter media. The filter media is substantially cone-shaped.

In a particularly suitable embodiment, a system for removing material from a volatile fluid includes a container defining an interior space. The fluid flows through the interior space from a lower portion of the container to an upper portion of the container and the container is configured to separate the fluid into a vapor and a liquid such that the liquid is disposed substantially in the upper portion. A filter media is disposed in the interior space intermediate the upper portion and the lower portion. The filter media is configured to hold material in a substantially stationary position as the fluid flows from the lower portion in a direction towards the upper portion and to release at least a portion of the material when a velocity of the fluid flow is reduced. The system further includes a collection area in the lower portion of the container. The collection area is configured to collect material that is released from the filter media as the velocity of the fluid flow is reduced.

In another suitable embodiment, the system further includes an injection port for injection of additives into the fluid.

In another suitable embodiment, the system further includes a sensor configured to detect a state of the filter media and an operator interface to indicate to an operator the state of the filter media.

In another suitable embodiment of the system described above, the container further includes an inlet and an outlet. The outlet is disposed intermediate the upper portion and the lower portion and the inlet is disposed intermediate the outlet and the lower portion.

In one particularly suitable embodiment, a filtering system for collecting material suspended in a volatile fluid includes a container defining an interior space for holding the fluid, an inlet for the fluid to enter the interior space, and an outlet for the fluid to flow out of the interior space. The fluid flows from the inlet towards the outlet. A collection mechanism is disposed within the container and at least partially between the outlet and the inlet. The collection mechanism is configured to collect the material suspended in the fluid and to release the material at selected times. The system further includes a valve connected in fluid communication with the filtering system and configured to control the supply of fluid through the filtering system. The collection mechanism releases the material when the valve is in a closed position.

In another suitable embodiment, the system described above is used in combination with a vehicle that travels along application paths. The collection mechanism is configured to release the material when the vehicle reaches the end of one of the application paths.

In yet another suitable embodiment, the collection mechanism includes a magnet. The magnet is magnetized to collect material. In one embodiment, the collection mechanism includes an electromagnet and a power source providing electrical current to the electromagnet.

In still another suitable embodiment, the system further includes a sensor configured to detect when the collection mechanism has collected a specified amount of material. The specified amount of material is based at least in part on the maximum collection capacity of the collection mechanism. In one embodiment, the system further includes a sensor configured to detect the amount of current through the electromagnet and a controller connected to the sensor. The controller is configured to determine based on the current and voltage when the collection mechanism has collected the specified amount of material.

Moreover, in another embodiment, upon determining the collection mechanism has collected the specified amount of material the controller performs at least one function of the following functions: indicating to an operator the collection mechanism has reached maximum capacity, activating a cycle of the collection mechanism to release at least a portion of the collected material, and powering off a power source connected to the controller.

While, in some embodiments, the described methods and systems are used to handle a fluid that is applied to agricultural fields, such as anhydrous ammonia, the described methods and systems may be used for handling any type of fluids, not just fluids for use in the agricultural industry.

Embodiments of the methods and systems described may more efficiently handle fluids compared to prior methods and systems. For example, the systems and methods described provide improved filtering systems that increase the operating efficiency and reduce maintenance time of application systems. More specifically, the embodiments described provide for more effectively removing material from fluid and efficiently disposing the removed material. Some embodiments provide for improved monitoring and control of components of the application systems to reduce incidents of misapplication.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A system for handling a fluid, the system comprising:
   a container for separating the fluid into a liquid and a vapor such that at least a portion of the vapor is disposed above the liquid;
   at least one valve for releasing the vapor from the container;
   at least one sensor to detect a level of the liquid in the container; and
   a controller communicatively coupled to the at least one valve and the at least one sensor, the controller configured to control the at least one valve to release the vapor such that the liquid level is maintained at or above a desired liquid level, wherein the controller is configured to determine diagnostic data based at least in part on signals received from at least one of the at least one valve and the at least one sensor.

2. The system of claim 1 furthering comprising a global positioning device communicatively coupled to the controller to determine one or more positions of the system, the controller configured to generate a spatial map of the diagnostic data based on the one or more determined positions of the system and to relate the diagnostic data to corresponding geographic positions of the system at which the diagnostic data was recorded.

3. The system of claim 1 wherein the controller determines the diagnostic data based at least in part on one of a pressure, a temperature, a density, a position of the at least one valve, saturation curves, and enthalpy charts.

4. The system of claim 1 wherein the diagnostic data includes an amount of vapor released through the at least one valve.

5. The system of claim 4, wherein the at least one valve comprises at least one solenoid valve configured to operate in a pulse-width-modulated mode, and wherein the controller is configured to determine the amount of vapor released through the at least one valve based on at least one of a pressure, a pulse width of the at least one solenoid valve, and a characteristic of the fluid.

6. The system of claim 4, wherein the controller is further configured to determine that the container is at least partially obstructed based on the amount of vapor released through the at least one valve.

7. The system of claim 4 further comprising an operator interface communicatively coupled to the controller, the operator interface configured to display an operational status in response to signals received from the controller, the operational status based at least in part on the amount of vapor released through the at least one valve, wherein the controller is configured to cause the operator interface to output at least one of an audibly and visually-perceptible alarm to indicate that at least a portion of the liquid is changing to vapor.

8. The system of claim 1 wherein the at least one sensor comprises a float.

9. The system of claim 1 wherein the at least one sensor comprises a capacitive device.

10. The system of claim 1 wherein the at least one sensor comprises a plurality of liquid presence sensors, at least one liquid presence sensor of the plurality of liquid presence sensors positioned above a liquid reference plane defined through the container and at least one other liquid presence sensor of the plurality of liquid presence sensors placed below the liquid reference plane.

11. The system of claim 1 further comprising at least one of a pressure sensor, a temperature sensor, a density sensor, a valve position sensor, a valve voltage sensor, a valve current sensor, a valve duty cycle sensor, a valve orifice measurement device, a flow sensor, and a flow switch.

12. A method of assembling a fluid handling system, the method comprising:
   connecting at least one valve to a container, the container configured to separate a fluid into a liquid and a vapor such that at least a portion of the vapor is disposed above the liquid, the at least one valve configured to release the vapor from the container;
   positioning at least one sensor within or adjacent to the container to detect a level of the liquid in the container; and
   communicatively connecting a controller to the at least one valve and the at least one sensor, the controller configured to control the at least one valve to release the vapor such that the liquid level is maintained at or above a desired liquid level, wherein the controller is configured to determine diagnostic data based at least in part on signals received from at least one of the at least one valve and the at least one sensor.

13. The method of claim 12 further comprising communicatively coupling an operator interface to the controller, the operator interface configured to display an operational status in response to signals received from the controller, the operational status based at least in part on the diagnostic data.

* * * * *